(12) United States Patent
Hirayama et al.

(10) Patent No.: US 12,448,242 B2
(45) Date of Patent: Oct. 21, 2025

(54) IMAGE READING APPARATUS AND METHOD OF CONTROLLING IMAGE READING APPARATUS

(71) Applicant: SEIKO EPSON CORPORATION, Tokyo (JP)

(72) Inventors: Yuko Hirayama, Kitakyushu (JP); Kenichi Murahashi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 216 days.

(21) Appl. No.: 18/475,304

(22) Filed: Sep. 27, 2023

(65) Prior Publication Data
US 2024/0109741 A1 Apr. 4, 2024

(30) Foreign Application Priority Data
Sep. 30, 2022 (JP) ................. 2022-158328

(51) Int. Cl.
  *B65H 7/12* (2006.01)
  *B65H 7/20* (2006.01)
  *H04N 1/00* (2006.01)
  *H04N 1/60* (2006.01)

(52) U.S. Cl.
  CPC .............. *B65H 7/12* (2013.01); *B65H 7/20* (2013.01); *H04N 1/6016* (2013.01)

(58) Field of Classification Search
  CPC . B65H 7/12; B65H 7/125; B65H 7/20; B65H 2553/42; H04N 1/00681; H04N 1/00724; H04N 1/203; H04N 1/00588; H04N 1/00013
  See application file for complete search history.

(56) References Cited

U.S. PATENT DOCUMENTS

| | | | |
|---|---|---|---|
| 2017/0094086 A1* | 3/2017 | Nomoto | H04N 1/00663 |
| 2017/0111524 A1* | 4/2017 | Tajima | H04N 1/00687 |
| 2017/0126911 A1* | 5/2017 | Kogi | H04N 1/0035 |
| 2017/0374214 A1* | 12/2017 | Kanamitsu | B65H 3/063 |
| 2017/0374216 A1 | 12/2017 | Kanamitsu et al. | |
| 2023/0208991 A1* | 6/2023 | Murahashi | H04N 1/00737 |
| | | | 358/474 |

FOREIGN PATENT DOCUMENTS

JP   2018-006853 A   1/2018

* cited by examiner

*Primary Examiner* — Luis A Gonzalez
(74) *Attorney, Agent, or Firm* — WORKMAN NYDEGGER

(57) ABSTRACT

An image reading apparatus is configured to read image data generated by reading a window within a junction of a carrier sheet and then to determine whether the target object is a carrier sheet, based on a total height of a first area and a plurality of second areas arranged with the first area therebetween in a transport direction as well as a first color width. In the first area, pixels in a second color are sequentially arrayed in the transport direction; in the second areas, pixels in a first color are sequentially arrayed in the transport direction; and the first color width indicates a length of an area in which a plurality of pixels in the first color are sequentially arrayed in a width direction.

11 Claims, 12 Drawing Sheets

IMAGE READING APPARATUS AND METHOD OF CONTROLLING IMAGE READING APPARATUS

The present application is based on, and claims priority from JP Application Serial Number 2022-158328, filed Sep. 30, 2022, the disclosure of which is hereby incorporated by reference herein in its entirety.

BACKGROUND

1. Technical Field

The present disclosure relates to an image reading apparatus and a method of controlling such an image reading apparatus.

2. Related Art

In the field of image reading apparatuses, an original sheet to be read is inserted into a transparent carrier sheet, and they are then transported together. JP-A-2018-6853 discloses a carrier sheet provided with a plurality of holes, and an image reading apparatus configured to identify this carrier sheet, based on the number and size of the holes.

During the transportation of a carrier sheet into which an original sheet is inserted, a light source irradiates this carrier sheet with light, and an image sensor in turn receives the light reflected from the carrier sheet, thereby reading the carrier sheet. If the carrier sheet being transported is in an improper position, however, the shadows may appear inside the respective holes in the carrier sheet. Those shadows may appear also in the result of reading the holes with the image sensor. In this case, the color of the holes in the carrier sheet may differ from its real one. Because of the impact of the shadows, the image reading apparatus may incorrectly recognize the holes, failing to identify the carrier sheet. In consideration of this disadvantage, some improvements are needed to precisely detect carrier sheets.

SUMMARY

The present disclosure is an image reading apparatus that includes: a transport section configured to transport a carrier sheet in a predetermined transport direction, the carrier sheet having a junction at which peripheries of two sheets are partly joined together, the sheets having respective transparent areas between which an original sheet is to be interposed; a reader configured to read a target object being transported by the transport section; and a controller that acquires image data, the image data being generated as a result of reading the target object with the reader. The junction has a window that transmits light. The controller is configured to perform a window height detection process and a window width detection process, based on binary image data generated as a result of a binarization process. In the window height detection process, a window height that indicates a length of the window in the transport direction is detected; in the window width detection process, a window width that indicates a length of the window in a width direction is detected, the width direction intersecting the transport direction; and in the binarization process, a predetermined color generated as a result of reading the window is converted into a first color, and a color other than the predetermined color is converted into a second color. When a total height of a first area and a plurality of second areas falls within a range from a predetermined window height lower limit to a predetermined window height upper limit in the window height detection process, the controller determines that detection of the window height is successful. In the first area, a plurality of pixels in the second color are sequentially arrayed in the transport direction; in the second areas, a plurality of pixels in the first color are sequentially arrayed in the transport direction. The second areas are arranged with the first area therebetween in the transport direction. When a first color width falls within a range from a predetermined window width lower limit to a predetermined window width upper limit in the window width detection process, the controller determines detection of the window width is successful, the first color width indicating a length of an area in which a plurality of pixels in the first color are sequentially arrayed in the width direction. When the detection of both the window height and the window width is successful, the controller determines that the target object is the carrier sheet. When the detection of at least one of the window height and the window width is unsuccessful, the controller determines that the target object is not the carrier sheet.

The present disclosure is also a method of controlling an image reading apparatus. The image reading apparatus includes: a transport section configured to transport a carrier sheet in a predetermined transport direction, the carrier sheet having a junction at which peripheries of two sheets are partly joined together, the sheets having respective transparent areas between which an original sheet is to be interposed; and a reader configured to read a target object being transported by the transport section, the junction having a window that transmits light. This method includes: a binarization step of converting a predetermined color in image data into a first color and converting a color other than the predetermined color in the image data into a second color to generate binary image data, the predetermined color being generated as a result of reading the window, the image data indicating a result of reading a target object with the reader; a window height detection step of detecting a window height, based on the binary image data, the window height indicating a length of the window in the transport direction; and a window width detection step of detecting a window width, based on the binary image data, the window width indicating a length of the window in a width direction, the width direction intersecting the transport direction. When a total height of a first area and a plurality of second areas falls within a range from a predetermined window height lower limit to a predetermined window height upper limit in the window height detection step, it is determined that detection of the window height is successful. In the first area, a plurality of pixels in the second color are sequentially arrayed in the transport direction; in the second areas, a plurality of pixels in the first color are sequentially arrayed in the transport direction. The second areas are arranged with the first area therebetween in the transport direction. When a first color width falls within a range from a predetermined window width lower limit to a predetermined window width upper limit in the window width detection step, it is determined that detection of the window width is successful, the first color width indicating a length of an area in which a plurality of pixels in the first color are sequentially arrayed in the width direction. When the detection of both the window height and the window width is successful, it is determined that the target object is the carrier sheet. When the detection of at least one of the window height and the window width is unsuccessful, it is determined that the target object is not the carrier sheet.

DESCRIPTION OF EMBODIMENTS

Some embodiments of the present disclosure will be described below with reference to the accompanying drawings. It should be noted that the drawings are simply used to illustrate the embodiments, and thus the scales, shapes, and densities of individual members therein may be incorrect, inconsistent with one another, or partly lacking.

1. OVERALL CONFIGURATION OF IMAGE READING APPARATUS

Figure 1:
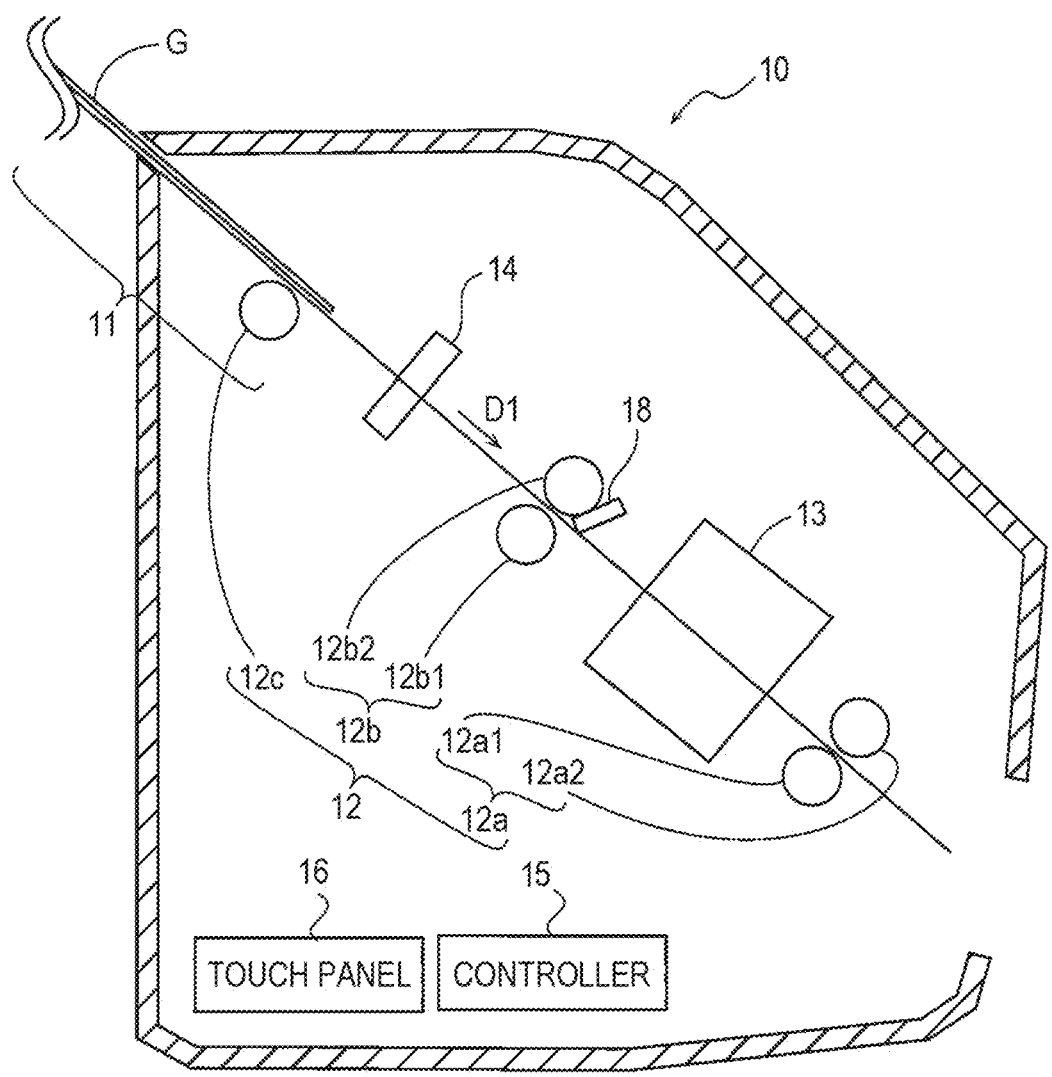
FIG. 1 schematically illustrates a configuration of an image reading apparatus according to an embodiment of the present disclosure as seen from a side.

FIG. 1 schematically illustrates a configuration of an image reading apparatus 10 according to an embodiment of the present disclosure as seen from a side. The image reading apparatus 10 includes: a mounting section 11 on which an original sheet G is to be placed; a transport section 12 that transports the original sheet G placed on the mounting section 11 along a predetermined transport route; a reader 13 that can read a target object being transported by the transport section 12; a multi-feeding detector 14 that detects whether some of the original sheets G being transported overlap each other; a controller 15; and a touch panel 16 that can display visual information and receive user input. However, the touch panel 16 is optional; alternatively, the image reading apparatus 10 may include a plurality of physical buttons that receive user input.

In this embodiment, in addition to the original sheet G, the transport section 12 can also transport a carrier sheet into which the original sheet G is interposed. Herein, an original sheet G and a carrier sheet into which the original sheet G is interposed may be each referred to as a target object; the carrier sheet may also be referred to as the original sheet holder; and the carrier sheet is abbreviated as CS.

The controller 15 includes: a processor; and a memory that stores programs and data required for the processor to perform various processes and that provides a working area. The controller 15 controls individual sections constituting the image reading apparatus 10. If the processes to be chronologically performed by the controller 15 are regarded as individual steps, the chronological sequence of these steps can be interpreted as a single method. The image reading apparatus 10 with the controller 15 performs a method of detecting a CS.

The transport section 12 includes: a supply roller pair 12b that has rollers 12b1 and 12b2 disposed opposite each other with a transport route therebetween; and an ejection roller pair 12a that has rollers 12a1 and 12a2 disposed opposite each other with the transport route therebetween. The roller 12b1 and 12a1 are disposed below the transport route, and they may be coupled to a motor (not illustrated) and rotate by means of the power from this motor. Herein, the direction (transport direction) in which the original sheet G is to be transported along the transport route is denoted by D1; "the upstream side and downstream side in the transport direction D1" is referred to, respectively, simply as "the upstream side and downstream side".

The supply roller pair 12b is disposed upstream of the reader 13 and transports a target object toward the downstream side, whereas the ejection roller pair 12a is disposed downstream of the reader 13 and transports the target object that has been read by the reader 13 to the downstream side. A PE sensor 18 is disposed adjacent to the supply roller pair 12b and senses an edge of the target object. The transport section 12 further includes, as its component, a load roller 12c disposed upstream of the supply roller pair 12b and adjacent to the mounting section 11. The load roller 12c supplies target objects one by one from the mounting section 11 to the transport route.

A multi-feeding detector 14 is disposed between the load roller 12c and the supply roller pair 12b. Although a plurality of original sheets G are regularly transported one by one, some of them are sometimes accidentally transported together while overlapping each other. This state is referred to as the multi-feeding. The multi-feeding detector 14 detects whether the multi-feeding has occurred, based on an attenuation of an ultrasonic wave through the original sheet G. The method of detecting an occurrence of the multi-feeding using an ultrasonic wave is a known technique and thus will not be described in detail. When determining an occurrence of the multi-feeding, based on the detection result of the multi-feeding detector 14, the controller 15 can perform a predetermined process, such as notifying an error or stopping the transport section 12 from transporting the original sheets G.

2. CONFIGURATION OF CS

Figure 2:
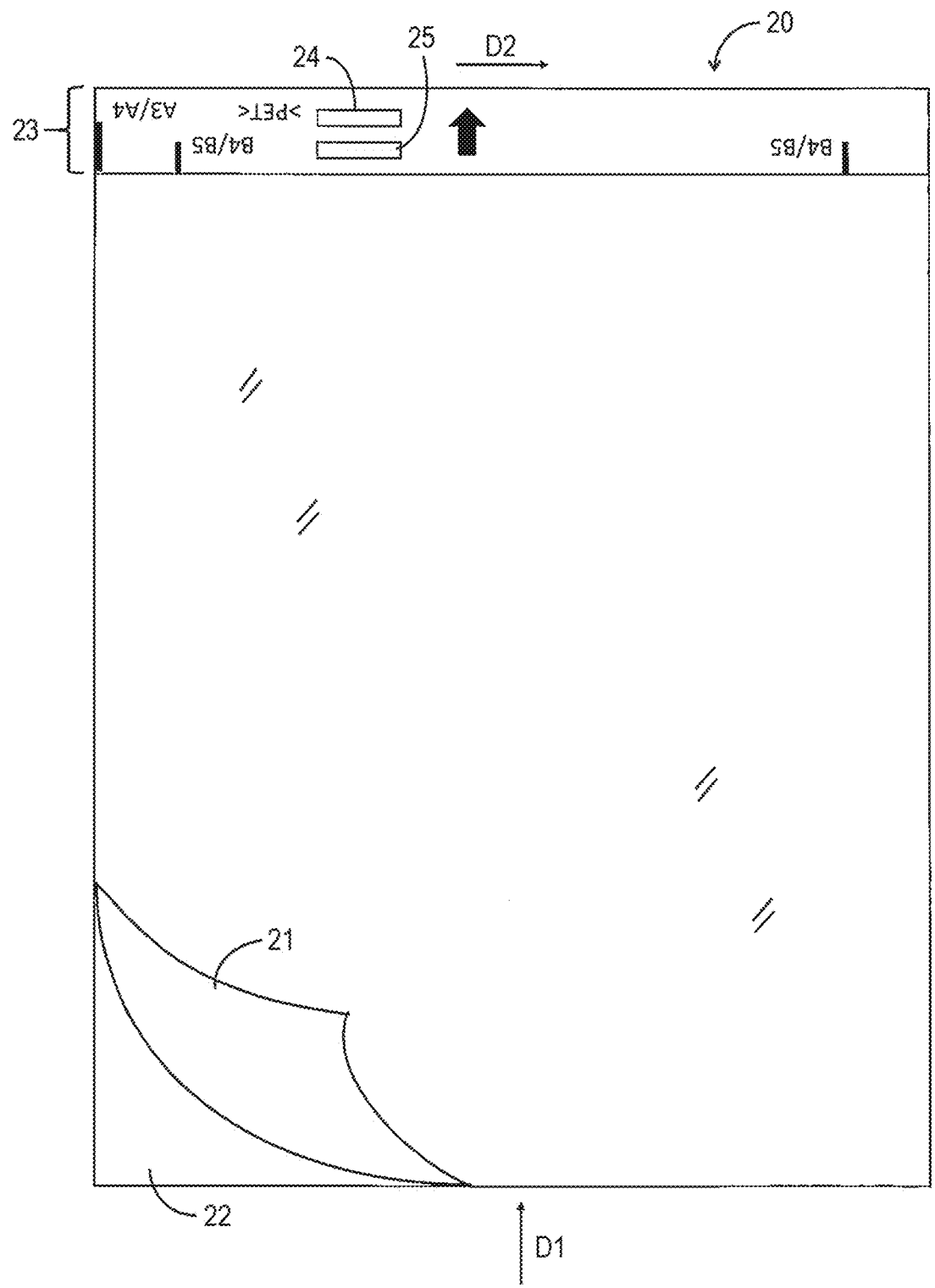
FIG. 2 schematically illustrates a carrier sheet to be transported in the image reading apparatus as seen from the top.

FIG. 2 schematically illustrates the CS 20 as seen from the top. Of the directions intersecting the transport direction D1 in FIG. 2, the right one is referred to as the width direction D2. In this case, both the transport direction D1 and the width direction D2 can be assumed to be orthogonal to each other. The CS 20 includes two transparent sheets, or sheets 21 and 22, between which the original sheet G is to be interposed. The peripheries of the sheets 21 and 22 are partly joined together. These bonded portions of the sheets 21 and 22 are referred to as a junction 23. Since the CS 20 is placed on the mounting section 11 with the junction 23 facing the downstream side, the junction 23 corresponds to a portion of the CS 20 which is to be first read by the reader 13.

The junction 23 may have thereon a print of a figure, a pattern, or one or more letters for instructing about how to handle the CS 20. The junction 23 has a first window 24 and a second window 25 as its windows. The junction 23 is a translucent section except for the first window 24 and the second window 25 and may have any color, such as white. Each of the first window 24 and the second window 25 is formed of a hole formed across the junction 23. Alternatively, each of the first window 24 and the second window 25 may be formed of a transparent material, similar to the sheets 21 and 22 between which an original sheet is to be interposed. In any case, each of the first window 24 and the second window 25 can transmit light.

As illustrated in FIG. 2, each of the first window 24 and the second window 25 has a perfectly or substantially rectangular shape. The first window 24 is positioned closer to the downstream side than the second window 25 is. In addition, both of the first window 24 and the second window 25 are arranged at the same or substantially the same location in the width direction D2. The controller 15 analyzes image data regarding the result of reading a target object with the reader 13 and then determines whether the first window 24 and the second window 25 are present on the target object. When determining that the first window 24 and the second window 25 are present thereon, the controller 15 determines that the target object being transported by the transport section 12 is the CS 20. Details of this will be described later.

Since the CS 20 configured above is a target object that significantly attenuates an ultrasonic wave, the multi-feeding detector 14 may mistakenly detect an occurrence of the multi-feeding during the transporting of the CS 20. It should be noted that the junction 23 does not necessarily have to be provided with two windows; alternatively, the junction 23 may be provided with a single window, such as the first window 24. Hereinafter, the length of each window in the transport direction D1 may be referred to as the window height, whereas the length of each window in the width direction D2 may be referred to as the window width.

3. IMPACT OF SHADOW

Figure 3A:
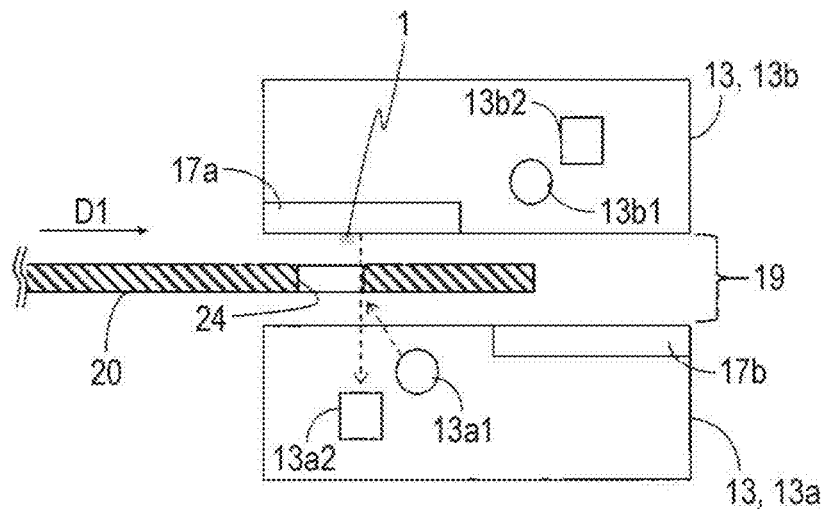
FIG. 3A schematically illustrates a downstream portion of the carrier sheet and the reader as seen from a side when the carrier sheet being transported is in a proper position.

FIG. 3A schematically illustrates a downstream portion of the CS 20 being transported and the reader 13 as seen from a side. It should be noted that the transport direction D1 is illustrated as a horizontal direction in FIG. 3A for good viewability, whereas the transport direction D1 is illustrated as a diagonally downward direction in FIG. 1. In addition, the first window 24 is illustrated alone in FIG. 3A as one of the windows in the CS 20; however, there is obviously no problem if the second window 25 is illustrated alone in FIG. 3A, instead of the first window 24.

As illustrated in FIG. 3A, the reader 13 includes a first reader 13a and a second reader 13b disposed opposite each other with a transport route 19 therebetween along which the target object is being transported. The first reader 13a is disposed below the transport route 19 and reads the lower surface of the target object, whereas the second reader 13b is disposed above the transport route 19 and reads the upper surface of the target object. In the example of FIG. 3A, the reader 13 can simultaneously read both the surfaces of the target object. In this embodiment, the image reading apparatus 10 does not necessarily have to be a product configured to simultaneously read both the surfaces of the target object; for example, the second reader 13b may be eliminated from the configuration of the product.

The first reader 13a includes: a first light source 13a1 that irradiates a target object with light; and a first image sensor 13a2 that receives the light reflected from the target object and reads the target object. Likewise, the second reader 13b includes: a second light source 13b1 that irradiates the target object with light; and a second image sensor 13b2 that receives the light reflected from the target object and reads the target object. As illustrated in FIG. 3A, the first light source 13a1 and the first image sensor 13a2 in the first reader 13a are disposed upstream of the second light source 13b1 and the second image sensor 13b2 in the second reader 13b. In this case, the first reader 13a reads the junction 23 of the CS 20 earlier than the second reader 13b does. With reference to FIG. 3A, a description will be given below of a shadow that appears when the first reader 13a reads the first window 24 within the junction 23.

A first background plate 17a is exposed from the second reader 13b at the location above the transport route 19 and faces both the first light source 13a1 and the first image sensor 13a2. Likewise, a second background plate 17b is exposed from the first reader 13a at the location below the transport route 19 and faces both the second light source 13b1 and the second image sensor 13b2. Each of the first background plate 17a and the second background plate 17b has a predetermined color, such as gray. In this case, the first reader 13a reads the color of the first background plate 17a through the first window 24. A window within the junction 23 has no color, but the color of a background plate which has been read by a read sensor through the window may be regarded as the color of the window.

As illustrated in FIG. 3A, the first light source 13a1 irradiates the target object with light at a location downstream of the first image sensor 13a2. As a result, the area of the target object disposed downstream of the first window 24 casts a shadow 1 on a portion of the first background plate 17a. When the downstream edge of the first window 24 passes over the reading site of the first image sensor 13a2, the first image sensor 13a2 reads the shadow 1. In this case, the color of the shadow 1 is darker than that of the first background plate 17a. FIG. 3A illustrates an example case where the target object is being transported in a proper position. More specifically, FIG. 3A illustrates the case where the target object is being transported along substantially the center of the transport route 19 in a vertical direction. If the CS 20 being transported is in a proper position, the shadow 1 on the first background plate 17a is relatively small and not much darker than the first background plate 17a. In this case, the difference in darkness between the shadow 1 and the first background plate 17a falls within an allowable range based on the product design. Thus, it can be said that the shadow 1 does not have a significant impact on the detection of the first window 24.

Figure 3B:
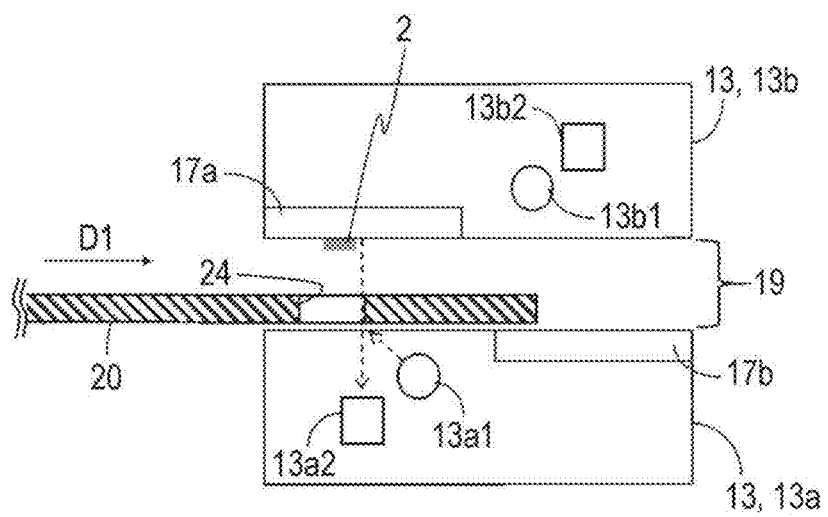
FIG. 3B schematically illustrates the downstream portion of the carrier sheet and the reader as seen from the side when the carrier sheet being transported is in an improper position.

FIG. 3B schematically illustrates a downstream portion of the CS 20 being transported and the reader 13 as seen from a side, as in FIG. 3A. The difference between the examples of FIGS. 3A and 3B will be described below. In the example of FIG. 3B, the target object being transported is in an improper position, as opposed to the example of FIG. 3A. More specifically, the CS 20 is being transported in the transport route 19 at a location closer to the first reader 13a than the second reader 13b. This position of the target object being transported can be attributed to errors or tolerances of the size and location of each roller in the transport section 12. When the CS 20 is excessively shifted toward the first reader 13a as in the example of FIG. 3B, a large amount of light emitted from the first light source 13a1 is blocked by the area of the CS 20 disposed downstream of the first window 24. As a result, a shadow 2 that is larger and darker than the shadow 1 tends to appear on the first background plate 17a. If the CS 20 being transported is in an improper position, the shadow 2 on the first background plate 17a, which is larger and darker than the shadow 1, may have an impact on the detection of the first window 24.

4. CS DETECTION METHOD

Figure 4:
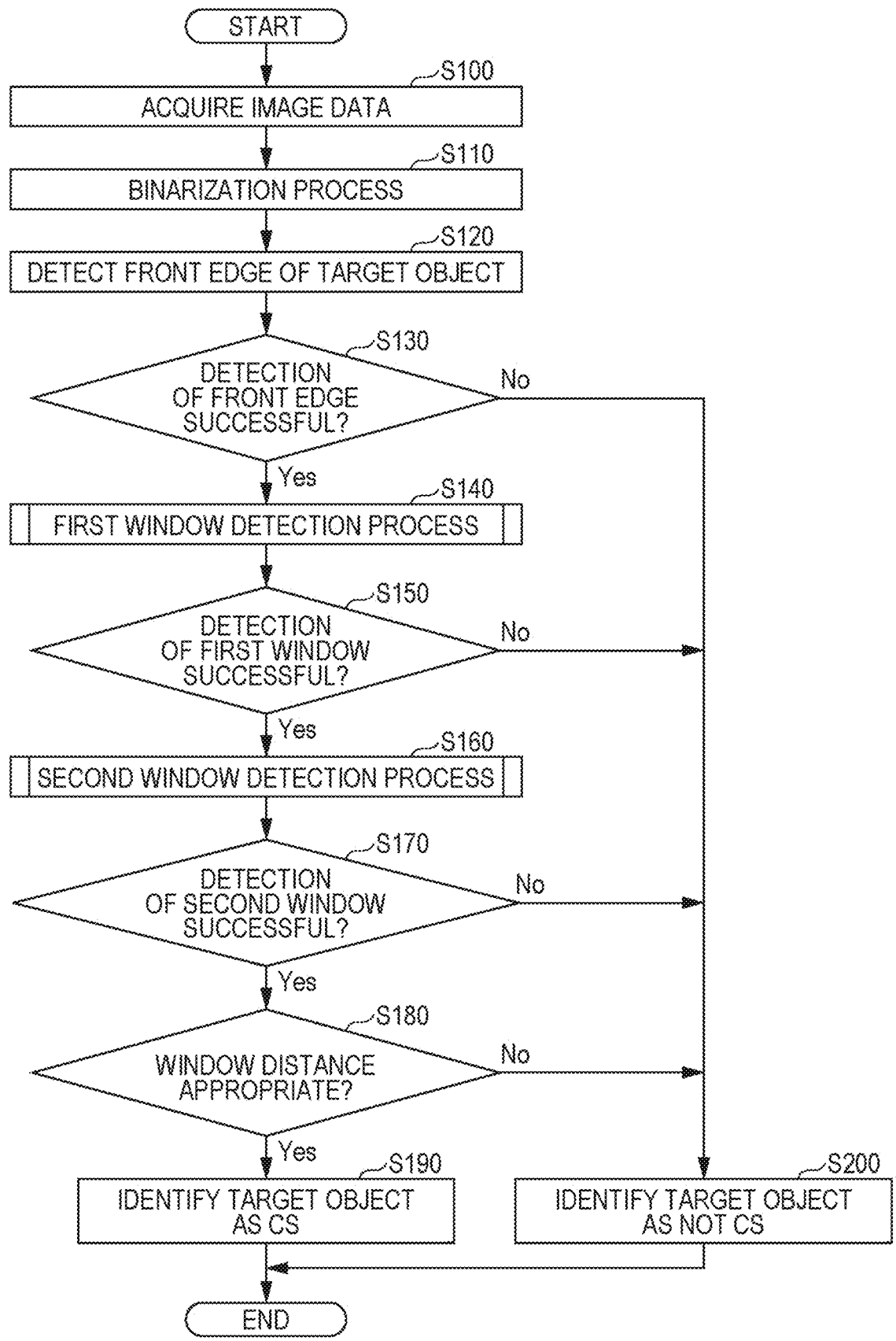
FIG. 4 is a flowchart of a carrier sheet detection method according to the embodiment.

FIG. 4 is a flowchart of a CS detection method to be performed by the controller 15. A user first places a target object on the mounting section 11 and then gives an instruction of starting a scanning operation through the touch panel 16 or any other input section. In response to this instruction, the controller 15 causes the transport section 12 to start transporting the target object and then causes the reader 13 to start a reading process at a predetermined timing, such as that after the PE sensor 18 has detected the downstream edge of the target object. In this embodiment, the downstream edge of a target object, image data, a portion of these, or another area or range is referred to as the front edge, whereas the upstream edge thereof is referred to as the rear edge.

At Step S100, the controller 15 acquires, from the reader 13, image data regarding the result of reading the target object with the reader 13. At Step S110, the controller 15 subjects the image data that has been acquired at Step S100 to a binarization process by which a predetermined color in the result of reading the first window 24 is converted into a first color and the remaining colors are converted into a second color. It should be noted that the first color and the second color generated through the binarization process need to be different colors.

The above predetermined color is identical to that of the first background plate 17a and the second background plate 17b as described above and thus can be acquired in advance by the controller 15. In this case, the controller 15 determines whether a color of each pixel in the image data is identical to the predetermined color. When determining that the color of a pixel is identical to the predetermined color, the controller 15 converts this color into the first color. When determining that the color of the pixel is different from the predetermined one, the controller 15 converts this color into the second color. In this case, a pixel in the first color is referred to as a black pixel, whereas a pixel in the second color is referred to as a white pixel. To make the determination using the predetermined color, the controller 15 may define a range of the predetermined color in consideration of a specified margin and, when a certain color falls outside this range, may determine that this color is different from the predetermined color. In this case, the controller 15 may convert the shadow 2, described above, on the first background plate 17a into the white pixel, depending on its darkness. The process at Step S110 corresponds to the binarization step. As a result of the process at Step S110, binary image data is generated.

In examples of FIGS. 3A and 3B, the first reader 13a and the second reader 13b read the respective surfaces of the target object to generate the image data. In this case, however, the image data subjected to the binarization process at Step S110 may be generated by reading the target object with the first reader 13a alone. In addition, the controller 15 may subject only a partial area of the CS 20 which corresponds to the junction 23 to the binarization process at Step S110. The controller 15 can acquire in advance the length, such as a few centimeters or millimeters from the front edge to the rear edge, of the junction 23 within the CS 20 in the transport direction D1 from its specifications.

After acquiring image data that has been generated by the first image sensor 13a2 in the first reader 13a as its reading results at Step S100, the controller 15 only has to perform the binarization process to a segment of the image data which corresponds to a partial area of the target object which has a predetermined length in the direction from the front edge to the rear edge of the target object and is expected to sufficiently contain the junction 23. In short, the controller 15 does not have to perform the binarization process to the image data corresponding to the entire area of the target object which has been generated by the first image sensor 13a2. The controller 15 accordingly can terminate the process in the flowchart in FIG. 4 before the reader 13 reads the entire target object.

At Step S120, the controller 15 detects the front edge of the target object, based on the binary image data. The binary image data contains a sequence of black pixels that corresponds to the color of the first background plate 17a, which the first image sensor 13a2 has read before reading the front edge of the target object. Thus, the controller 15 may sequentially scan the binary image data in the direction from the front edge to the rear edge of the target object and detect the front edge by finding a white pixel following this sequence of black pixels. When successfully detecting the front edge of the target object, the controller 15 selects Yes at Step S130 and then proceeds to Step S140. When failing to detect the front edge of the target object for some reasons, the controller 15 selects No at Step S130 and then proceeds to Step S200.

At Step S140, the controller 15 performs a process of detecting the first window 24. When successfully detecting the first window 24, the controller 15 selects Yes at Step S150 and then proceeds to Step S160. When failing to detect the first window 24, the controller 15 selects No at Step S150 and then proceeds to Step S200.

At Step S160, the controller 15 performs a process of detecting the second window 25. When successfully detecting the second window 25, the controller 15 selects Yes at Step S170 and then proceeds to Step S180. When failing to detect the second window 25, the controller 15 selects No at Step S170 and then proceeds to Step S200. Details of Steps S140 and S160 will be described later with reference to FIG. 5 and some other drawings.

At Step S180, the controller 15 determines whether a window distance is appropriate. The window distance refers to the distance between the first window 24 and the second window 25 in the transport direction D1. The window distance may be defined as the distance between the centers of the first window 24 and the second window 25. Alternatively, the window distance may be the distance between the rear edge of the first window 24 and the front edge of the second window 25. The controller 15 can acquire in advance the window distance from the specifications of the CS 20. The controller 15 determines whether the detected window distance, which corresponds to the distance in the transport direction D1 between the first window 24 detected at Step S140 and the second window 25 detected at Step S160, falls within the range from the lower limit to the upper limit of the window distance which has been preset based on the specifications. When determining that the detected window distance falls within the range from the lower limit to the upper limit of the window distance, the controller 15 selects Yes at Step S180 and then proceeds to Step S190. When determining that the detected window distance falls outside the range from the lower limit to the upper limit of the window distance, the controller 15 selects No at Step S180 and then proceeds to Step S200.

At Step S190, the controller 15 determines that the target object being transported by the transport section 12 is the CS 20, after which controller 15 completes the process in the flowchart of FIG. 4. In this way, the CS 20 can be detected. At Step S200, the controller 15 determines that the transport section 12 being transported is not the CS 20, after which the controller 15 completes the process in the flowchart of FIG. 4. It should be noted that Steps S190 and S200 correspond to a CS detection step.

If the CS 20 is provided with the first window 24 alone as its window, the controller 15 may skip Steps S160, S170, and S180, in which case it is necessary to modify the flowchart of FIG. 4 so that the controller 15 proceeds to either Steps S190 or S200 after the decision box at Step S150. Likewise, if the CS 20 is provided with the first window 24 alone as its window, the controller 15 may also skip both Steps S300 and S320 in FIG. 5, which will be described later.

If the CS 20 is provided with both the first window 24 and the second window 25, the controller 15 can appropriately determine the properness of the window distance at Step S180. Therefore, the controller 15 is less likely to mistakenly determine that the original sheet is the CS 20, for example, when an original sheet is different from the CS 20 but provided with two similar holes. Even if the CS 20 is provided with both the first window 24 and the second window 25, however, the controller 15 may also skip Step S180 for the simplification of the process in the flowchart of FIG. 4. Hereinafter, the description will be continued on the assumption that the CS 20 is provided with both the first window 24 and the second window 25.

Figure 5:
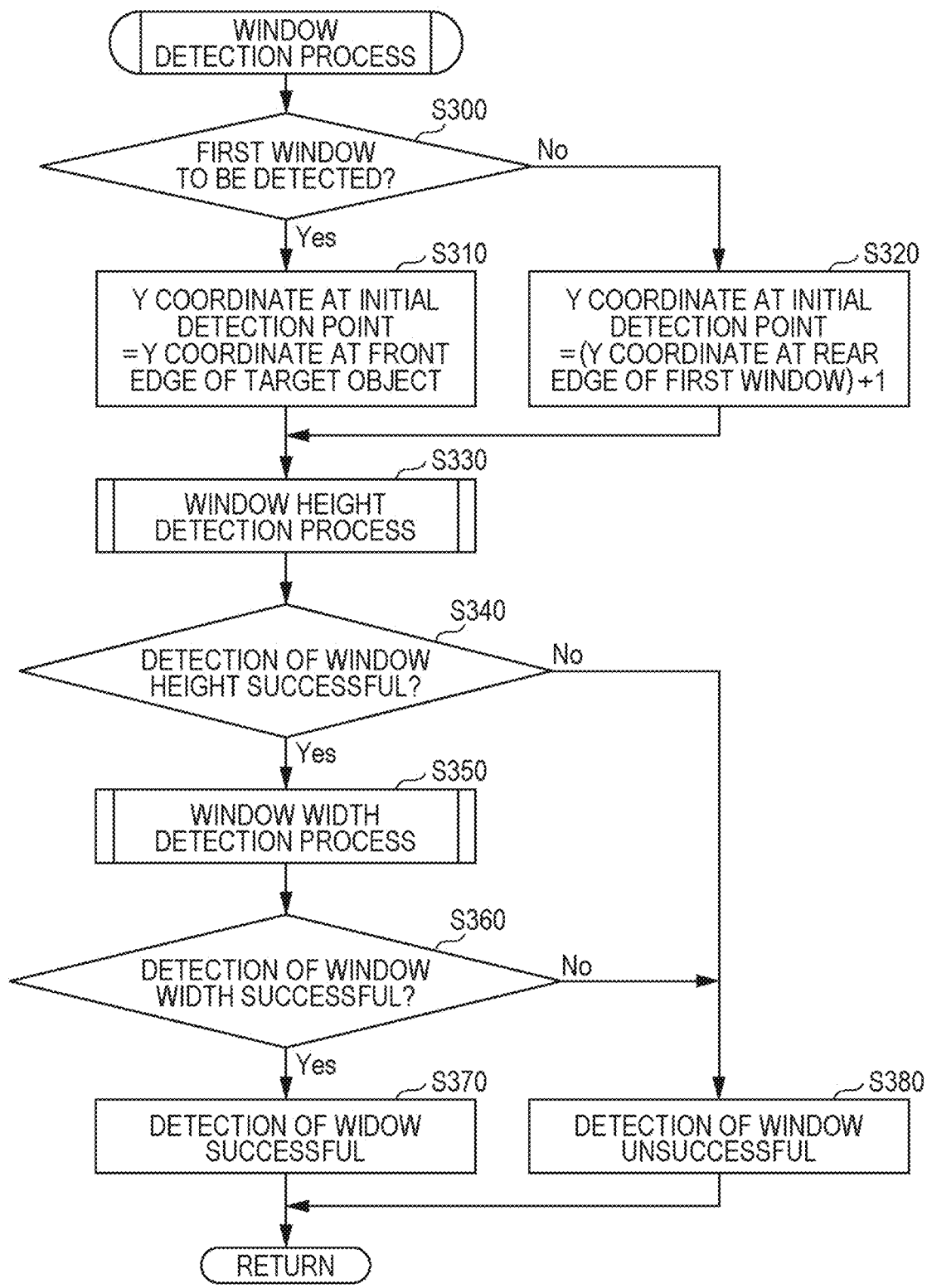
FIG. 5 is a flowchart of the window detection process at each of Steps S140 and S160 in FIG. 4.

FIG. 5 is the flowchart of the window detection process to be performed at each of Steps S140 and S160. At Step S300, the controller 15 determines whether a window to be currently detected (target window) is the first window 24. When the target window is the first window 24, the controller 15 selects Yes at Step S300 and then proceeds to Step S310. When the target window is the second window 25, the controller 15 selects No at Step S300 and then proceeds to Step S320. In short, the controller 15 selects Yes at Step S300 during the process at Step S140 and No at Step S300 during the process at Step S160. The controller 15 needs to choose one of Steps S310 and S320, depending on which of Steps S140 and S160 are being performed.

The controller 15 defines the locations of the pixels constituting the binary image data by using the X-Y coordinate system having intersecting axes, or X and Y axes. In the process using the binary image data, the Y-axis extends in the transport direction D1, whereas the X-axis extends in the width direction D2. In addition, the downstream side in the transport direction D1 corresponds to the negative side in the Y-axis, whereas the upstream side in the transport direction D1 corresponds to the positive side in the Y-axis. At Step S310, the controller 15 sets the Y coordinate at the initial detection point to that at the front edge of the target object and then proceeds to Step S330. At Step S320, the controller 15 sets the Y coordinate at the initial detection point to the value obtained by adding "1" to the Y coordinate at the rear edge of the first window 24. The controller 15 then proceeds to Step S330. The Y coordinate at the front edge of the target object corresponds to the location of the front edge of the target object which has been detected at Step S120. In this case, the controller 15 has already acquired the Y coordinate at the rear edge of the first window 24 at the timing of Step S160 following Step S140. However, a black pixel is present on the Y coordinate at the rear edge of the first window 24 as described later. Since the controller 15 identifies a white pixel as the initial detection point at Step S320, the controller 15 sets the Y coordinate at the initial detection point to that of the pixel positioned next to and on the positive side of the Y coordinate at the rear edge of the first window 24.

At Step S330, the controller 15 performs the window height detection process, based on the binary image data. When successfully detecting the window height in the window height detection process, the controller 15 selects Yes at Step S340 and then proceeds to Step S350. When failing to detect the window height in the window height detection process, the controller 15 selects No at Step S340 and then proceeds to Step S380.

At Step S350, the controller 15 performs the window width detection process, based on the binary image data. When successfully detecting the window width in the window width detection process, the controller 15 selects Yes at Step S360 and then proceeds to Step S370. When failing to detect the window width in the window width detection process, the controller 15 selects No at Step S360 and then proceeds to Step S380.

As described above, when the detection of both the window height and the window width is successful, the controller 15 proceeds to Step S370. When the detection of at least one of the window height and the window width is unsuccessful, the controller 15 proceeds to Step S380. At Step S370, the controller 15 determines that the detection of the window to be currently detected is successful and then returns to the process in the flowchart of FIG. 4. At Step S380, the controller 15 determines that the detection of the target window is unsuccessful and then returns to the process in the flowchart of FIG. 4. The determination at Step S370 or S380 in Step S140 is directly reflected on the determination at Step S150; likewise, the determination at Step S370 or S380 in Step S160 is directly reflected on the determination at Step S170. In this case, when the detection of both the window height and window width is successful, the controller 15 determines that the target object is the CS 20. When the detection of at least one of the window height and window width is unsuccessful, the controller 15 determines that the target object is not the CS 20.

5. DETAILS OF WINDOW HEIGHT DETECTION PROCESS

Figure 6:
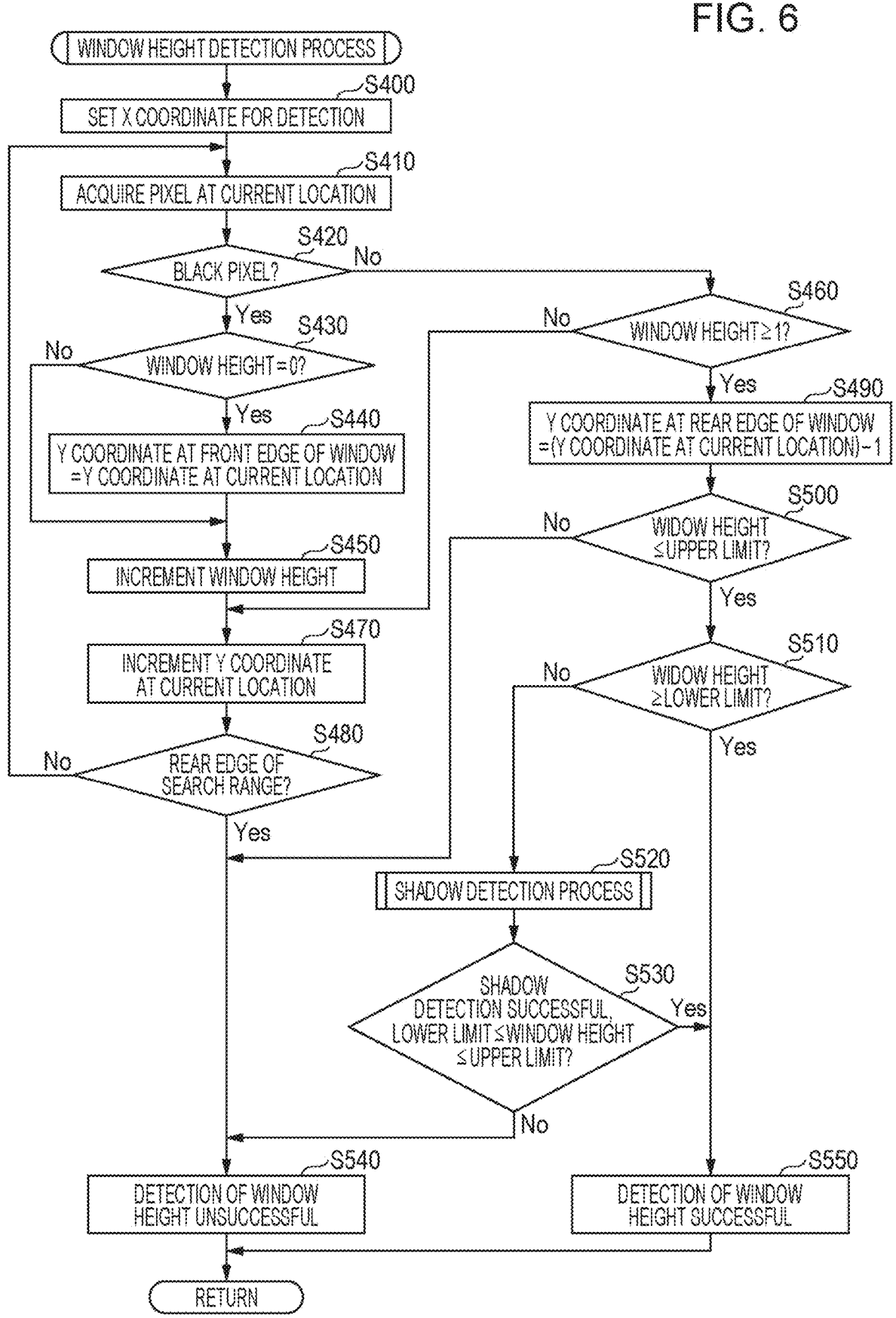
FIG. 6 is a flowchart of the window height detection process at Step S330 in FIG. 5.

FIG. 6 is a flowchart of the window height detection process at Step S330 in FIG. 5. This window height detection process may also be referred to as the window height detection step. At Step S400, the controller 15 sets an X coordinate used for the detection. More specifically, the controller 15 sets the X coordinate in the binary image data which is used for the detection, based on location information that predefines the central location of the window in the width direction D2.

The locations of the first window 24 and the second window 25 within the junction 23 are defined in the specifications of the CS 20. If the CS 20 is properly placed by the user on the mounting section 11, the controller 15 can acquire the central location of the window in the width direction D2 within the transport route. In addition, the X coordinate of the center of the window in the binary image data can also be defined in the specifications of the CS 20 regarding the locations of the first window 24 and the second window 25 within the junction 23. In this case, suppose the location information in which the center of the first window 24 and the second window 25 is positioned on the X coordinate (x1) is predefined. The controller 15 accordingly sets the X coordinate used for the detection to x1 at Step S400.

Through Step S310 or S320 in FIG. 5 and Step S400 in FIG. 6, the controller 15 determines on which X-Y coordinates it will start the window height detection process. When the target window is the first window 24, the controller 15 determines the X-Y coordinates at which it will start the window height detection process, through Steps S310 and S400. When the target window is the second window 25, the controller 15 determines the X-Y coordinates at which it will start the window height detection process, through Steps S320 and S400.

Figure 7A:
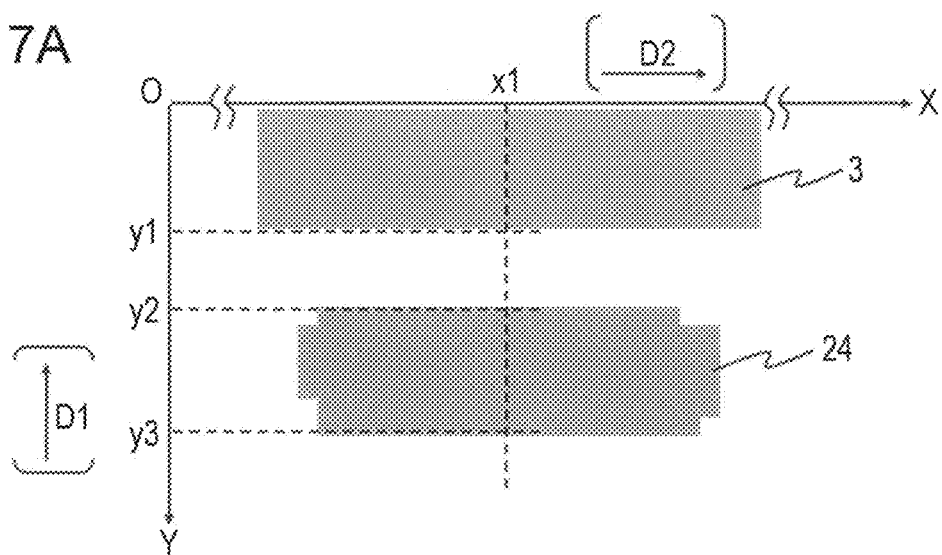
FIG. 7A illustrates an example of an X-Y coordinate system in which part of binary image data is expanded.

FIG. 7A illustrates an example of an X-Y coordinate system at a predetermined reference origin O, in which a segment of binary image data is expanded. In FIG. 7A, the gray areas are each a collective area formed of black pixels, and the remaining area is a collective area formed of white pixels. In FIG. 7A, of the collective areas formed of the black pixels, one corresponding to the result of reading the first window 24 is denoted by 24. The collective area 24 formed of the black pixels in the binary image data is also referred to as the first window 24, for facilitating understanding. In FIG. 7A, the black pixels in the collective area denoted by 3 are related to the color of the first background plate 17a, which has been read by the first reader 13a before the front edge of the target object has been read.

In the case where the Y coordinate at the front edge of the target object which has been set at Step S310 in FIG. 5 is denoted by y1, the controller 15 starts the window height detection process on the first window 24 at the X-Y coordinates (x1, y1). When placed by the user on the mounting section 11, the CS 20 is sometimes slightly shifted to one side in the width direction D2 or somewhat angled in the transport direction D1. As a result, the center of the first window 24 in the width direction D2 may actually be misaligned from the X coordinate x1 in the binary image data. However, the center of the first window 24 in the width direction D2 is less likely to be largely misaligned from the X coordinate (x1). Thus, it can be said that, when the reader 13 scans the pixels in the binary image data along the Y axis, the window substantially reliably passes through the X coordinate (x1). The X coordinate (x1) in the binary image data corresponds to a reference detection location in the width direction D2.

At Step S410, the controller 15 acquires a pixel in the binary image data at a current location. When Step S410 is performed immediately after Step S400, the current location obviously coincides with the initial point in the window height detection process. In addition, the pixel at the initial point in the window height detection process is white. At Step S420, the process is branched into two steps; the controller 15 selects to which step it proceeds, depending on whether the pixel at the current location is black or white. When the pixel at the current location is black, the controller 15 selects Yes at Step S420 and then proceeds to Step S430.

When the pixel at the current location is white, the controller 15 selects No at Step S420 and then proceeds to Step S460.

At Step S460, the controller 15 determines whether the window height is equal to or more than 1. When the window height is equal to or more than 1, the controller 15 selects Yes and then proceeds to Step S490. When the window height is equal to 0, the controller 15 selects No and then proceeds to Step S470. Since the controller 15 will increment the window height at Step S450 as described later, the window height can be equal to or more than 1. The unit of the window height will be incremented at Step S450 may be the number of pixels.

At Step S430, the controller 15 determines whether the window height is equal to 0. When the window height is equal to 0, the controller 15 selects Yes and then proceeds to Step S440. When the window height is equal to or more than 1, the controller 15 selects No and then proceeds to Step S450. At the time when Yes is selected at Step S420, the window height becomes 0. At Step S440, the controller 15 sets the Y coordinate at the current location to that at the front edge of the window and then proceeds to Step S450.

At Step S450, the controller 15 increments the window height. More specifically, the controller 15 updates the window height by adding "1" to the current value of the window height. When Step S450 is performed immediately after Step S440, the controller 15 updates the window height from "0" to "1". When Step S470 is performed immediately after Step S450 or S460, the controller 15 increments the Y coordinate at the current location. In other words, the controller 15 shifts the current location by one pixel toward the positive side along the Y-axis.

At Step S480, the controller 15 determines whether the current location has reached the rear edge of the search range for the window height. The search range for the window height refers to the distance in the transport direction D1 which has been defined in the specifications of the CS 20 regarding the window height and is preset so to be long enough for the reader 13 to scan a target object to detect the window height of a window. In this case, the controller 15 may make the determination at Step S480 under the condition that the Y coordinate of the initial point that has been set at Step S310 or S320 in FIG. 5 coincides with that at the front edge of the search range for the window height.

After the current location has reached the rear edge of the search range for the window height, the controller 15 no longer continues to detect the window height because it is difficult to accurately detect the window height. The controller 15 accordingly selects Yes at Step S480 and then proceeds to Step S540. When the current location does not yet reach the rear edge of the search range for the window height, the controller 15 selects No at Step S480 and then returns to Step S410. At Step S540, the controller 15 determines that it has failed to detect the window height of the target window and then returns to the process in the flowchart of FIG. 5.

At Step S490, the controller 15 sets the Y coordinate at the rear edge of the window to a value obtained by subtracting "1" from the Y coordinate at the current location ((Y coordinate at current location)−1). The "(Y coordinate at the current location)−1" corresponds to the location of the pixel next to and on the negative side of the pixel at the current location. Since the white pixel is positioned at the current location at the time of Step S490, the controller 15 regards the black pixel next to and on the negative side of this white pixel as the pixel at the rear edge of the window. Through the process to Step S490, the controller 15 has determined the window height once. More specifically, the controller 15 has determined the window height, based on the Y coordinates of the front edge and rear edge of the window which have been detected at Steps S440 and S490 and the number of times that Step S450 has been repeated until Step S490.

The process flow to Step S490 will be described with reference to FIG. 7A. At Step S410, the controller 15 first acquires a white pixel at the X-Y coordinates (x1, y1), which corresponds to the current location. At Steps S420, S460, and S480, the controller 15 then selects No multiple times in a cyclic manner. When the current location reaches the X-Y coordinates (x1, y2) at which a black pixel appears following a sequence of white pixels, the controller 15 selects Yes at Step S420. After performing the processes at Steps S430, S440, S450, and S470 in this order, the controller 15 selects Yes at Step S420 and No at Step S430 multiple times in a cyclic manner. When the current location moves over the X-Y coordinates (x1, y3) to the positive side on which a white pixel appears following a sequence of white pixels, the controller 15 selects No again at Step S420. The controller 15 selects Yes at Step S460 and determines that the window height is equal to the distance between the Y coordinates (y2) and (y3).

Figure 7B:
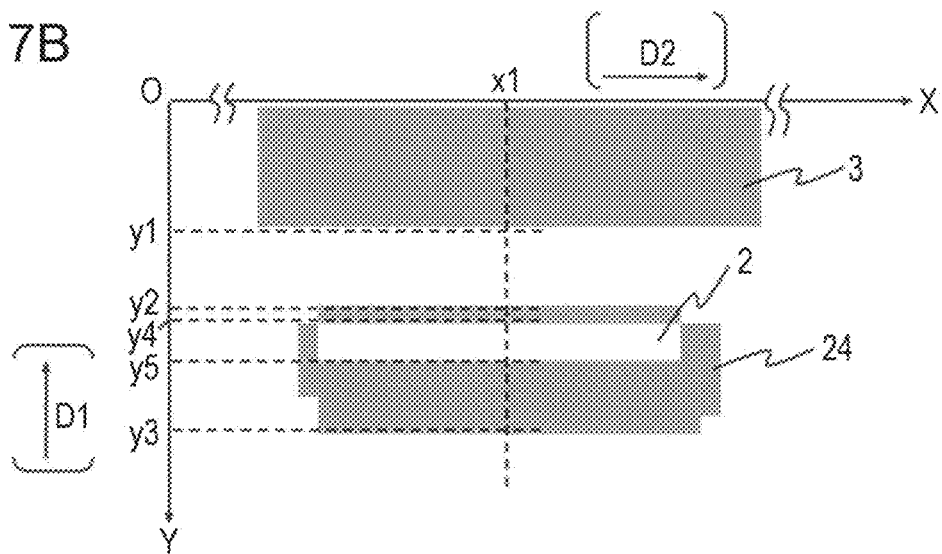
FIG. 7B illustrates another example of the X-Y coordinate system in which a segment of the binary image data is expanded.
Figure 7C:
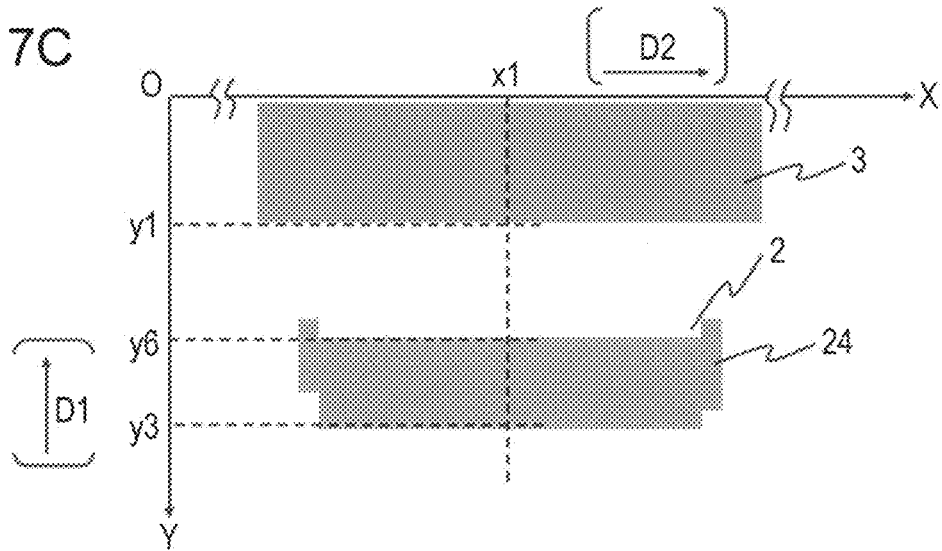
FIG. 7C illustrates further another example of the X-Y coordinate system in which a segment of the binary image data is expanded.

FIGS. 7B and 7C each illustrate an example of the X-Y coordinate system in which a segment of the binary image data is expanded. Since the perspective of FIGS. 7B and 7C is identical to that of FIG. 7A, the same description will not be given again below. The difference between the examples of FIGS. 7B and 7A is that the collective area 2 formed of white pixels which corresponds to the result of reading the shadow 2 is positioned inside the first window 24 and close to the front edge of the first window 24. The collective area 2 formed of the white pixels inside the first window 24 in the binary image data is also referred to as the shadow 2, for facilitating understanding.

The example of FIG. 7C is similar to the example of FIG. 7B in that the shadow 2 is present inside the first window 24, but it differs in that the white pixels forming the shadow 2 are disposed in the portion of the first window 24 close to its front edge. In the example of FIG. 7A, the shadow has little impact on the result of reading the window, as described with reference to FIG. 3A. In the examples of FIGS. 7B and 7C, however, the shadow has a significant impact on the result of reading the window, as described with reference to FIG. 3B.

The process flow to Step S490 in FIG. 6 will be described with reference to FIG. 7B. At Step S410, the controller 15 acquires the white pixel at the X-Y coordinates (x1, y1). At Steps S420, S460, and S480, the controller 15 then repeatedly selects No multiple times in a cyclic manner. When the current location reaches the X-Y coordinates (x1, y2) at which a black pixel appears following the sequence of white pixels, the controller 15 selects Yes at Step S420. After performing the processes at Steps S430, S440, S450, and S470, the controller 15 selects No at Step S480, Yes at Step S420, and No at Step S430 in this order multiple times in a cyclic manner. When the current location moves over the X-Y coordinates (x1, y4) to the positive side along the Y-axis on which the white pixels forming the shadow 2 appear following the sequence of black pixels, the controller 15 selects No at Step S420. The controller 15 then selects Yes at Step S460 and determines that the distance between the Y coordinates (y2) and (y4) is the window height at Step S490.

The process flow to Step S490 in FIG. 6 will be described with reference to FIG. 7C. At Step S410, the controller 15 acquires the white pixel at the X-Y coordinates (x1, y1). At Steps S420, S460, and S480, the controller 15 then repeatedly selects No multiple times in a cyclic manner. When the current location reaches the X-Y coordinates (x1, y6) at which a black pixel appears following the sequence of white pixels, the controller 15 selects Yes at Step S420. After performing the processes at Steps S430, S440, S450, and S470, the controller 15 selects No at Step S480, Yes at Step S420, and No at Step S430 in this order multiple times in a cyclic manner. When the current location moves over the X-Y coordinates (x1, y3) to the positive side along the Y-axis on which a white pixel appears following the sequence of black pixels, the controller 15 selects No at Step S420. The controller 15 then selects Yes at Step S460 and determines that the distance between the Y coordinates (y6) and (y3) is the window height at Step S490.

At Step S500, the controller 15 determines whether the resultant window height is equal to or less than a predetermined window height upper limit. When the window height is more than the window height upper limit, the controller 15 selects No at Step S500 and then proceeds to Step S540. When the window height is equal to or less than the window height upper limit, the controller 15 selects Yes at Step S500 and then proceeds to Step S510.

At Step S510, the controller 15 determines whether the window height is equal to or more than a predetermined window height lower limit. When the window height is less than the window height lower limit, the controller 15 selects No at Step S510 and then proceeds to a shadow detection process at Step S520. When the window height is equal to or more than the window height lower limit, the controller 15 selects Yes at Step S510 and then proceeds to Step S550. Both the window height upper limit and the window height lower limit are preset based on the specifications of the CS 20 regarding the window height so as to consider the allowable range for the window height which can be used to determine whether a window height detected from the binary image data is a correct one. Obviously, the window height upper limit is lower than the largest value within the above search range.

At Step S550, the controller 15 determines that the detection of the window height of the target window is successful and then returns to the process in the flowchart of FIG. 5. The determination at Step S540 or S550 is directly reflected in the determination at Step S340 in FIG. 5. FIGS. 7A, 7B, and 7C will be referenced again. Since it can be said that the window height between (y2) and (y3) detected as illustrated in FIG. 7A substantially accurately represents the window height of the first window 24, this window height can satisfy the conditions (Yes is selected) at both Steps S500 and S510. Likewise, the window height between (y6) and (y3) detected as illustrated in FIG. 7C can satisfy the conditions at both Steps S500 and S510 with high probability.

In the process to Step S550, the controller 15 performs the window height detection process. When a first color height, which refers to the length of the range defined by a sequence of pixels in the first color, falls within the range from the window height upper limit to the window height lower limit, the controller 15 determines that the detection of the window height is successful. In this case, the first color height represents the length of the area in which a plurality of black pixels are sequentially arrayed in the transport direction D1. As can be understood from the above description, the first color height corresponds to the distance between the Y coordinates (y2) and (y3) in FIG. 7A, for example.

Because of the impact of the shadow 2, the window height corresponding to the distance between the Y coordinates (y2) and (y4) detected as illustrated in FIG. 7B is much shorter than the actual one of the first window 24. The controller 15 accordingly selects No at Step S510. This embodiment provides the case where the shape of the detected window is separated into two independent areas due to the impact of the shadow 2, as in the example of FIG. 7B. In this case, the controller 15 selects No at Step S510 and then performs the processes at Steps S520 and S530.

Figure 8:
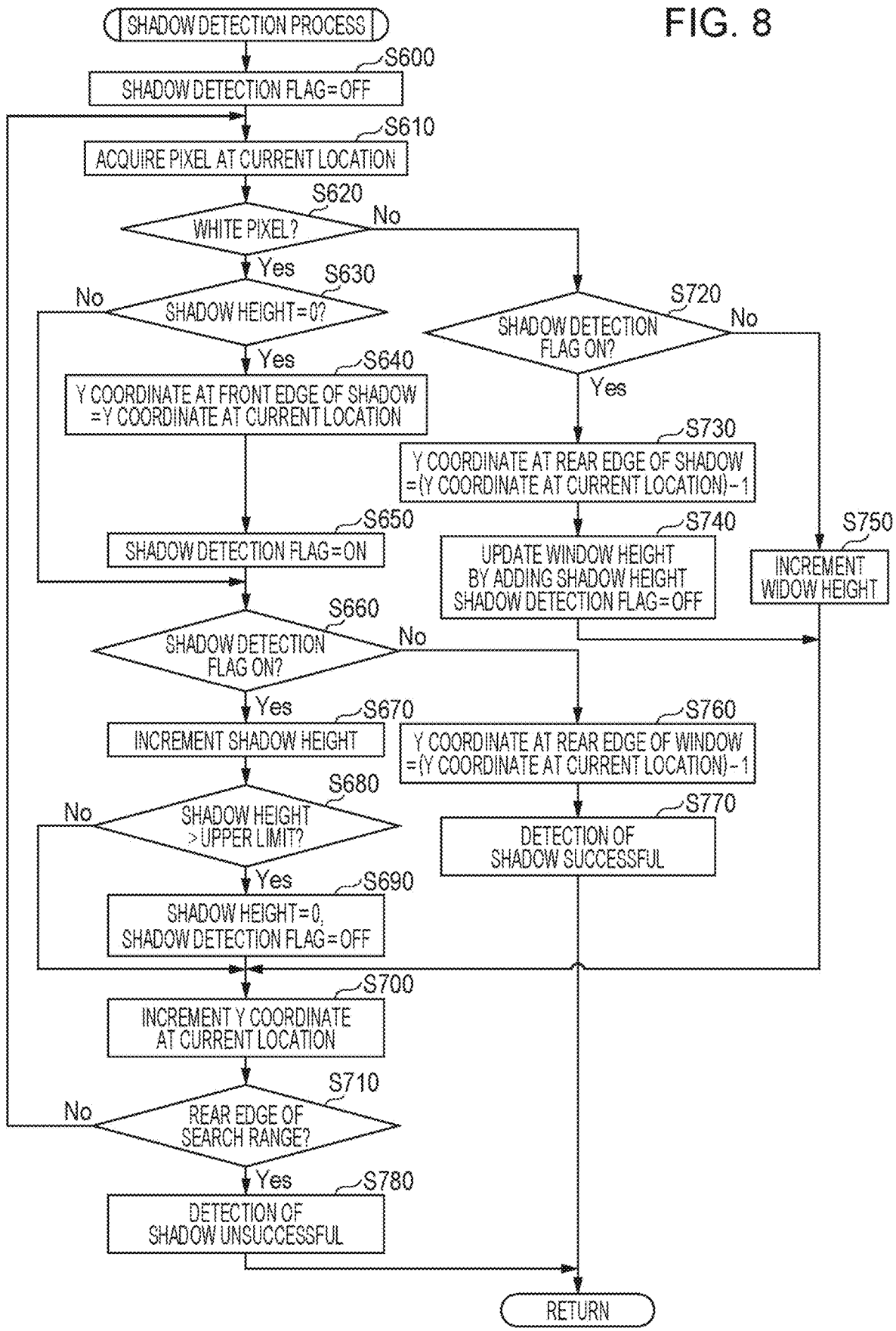
FIG. 8 is a flowchart of the shadow detection process at Step S520 in FIG. 6.

FIG. 8 is a flowchart of the shadow detection process at Step S520. At Step S600, the controller 15 initializes a shadow detection flag by setting it to OFF. In this case, the shadow detection flag indicates that the shadow detection is in progress. This shadow detection flag is referred to below simply as the flag. At Step S610, the controller 15 acquires the pixel at the current location. The process at Step S610 is performed in substantially the same manner as at Step S410 in FIG. 6. When Step S610 is performed immediately after Step S600, the pixel at the current location is white.

At Step S620, the process is branched into two steps; the controller 15 selects to which step it proceeds, depending on whether the pixel at the current location is white or black. When the pixel at the current location is white, the controller 15 selects Yes at Step S620 and then proceeds to Step S630. When the pixel at the current location is black, the controller 15 selects No at Step S620 and then proceeds to Step S720.

At Step S630, the controller 15 determines whether a shadow height is equal to 0. When the shadow height is equal to 0, the controller 15 selects Yes and then proceeds to Step S640. When the shadow height is more than 0, the controller 15 selects No and then proceeds to Step S660. This shadow height refers to the length of a shadow in the transport direction D1 and may be regarded as the length of a shadow along the Y-axis in the binary image data. The shadow height is detected by counting the number of pixels, as in the case where the window height is detected.

At Step S640, the controller 15 sets the Y coordinate at the current location to that at the front edge of the shadow and then proceeds to Step S650. At Step S650, the controller 15 sets the flag to ON and then proceeds to Step S660.

At Step S660, the controller 15 determines whether the flag is set to ON or OFF. When the flag is set to ON, the controller 15 selects Yes and then proceeds to Step S670. When the flag is set to OFF, the controller 15 selects No and then proceeds to Step S760. At Step S670, the controller 15 increments the shadow height. More specifically, the controller 15 updates the shadow height by adding "1" to the current value of the shadow height. By repeating the process at Step S670, the shadow height is increased.

At Step S680, the controller 15 determines whether the shadow height is more than a predetermined shadow height upper limit. In this case, since the shadow is normally present inside the window, an object that is larger than the window may be regarded as a portion of the junction 23, not a shadow. In this embodiment, the shadow height upper limit is preset to a value smaller than the window height upper limit. When the shadow height is more than the shadow height upper limit, the controller 15 selects Yes at Step S680 and then proceeds to S690. When the shadow height is equal to or less than the shadow height upper limit, the controller 15 selects No at Step S680 and then proceeds to S700.

At Step S690, the controller 15 initializes the current value of the shadow height to "0" and then sets the flag to OFF, after which the controller 15 proceeds to Step S700. In this case, the controller 15 makes the previous detection of the shadow height invalid. At Step S680 or at Step S700 immediately after Step S690, the controller 15 increments the Y coordinate at the current location, as at Step S470 in FIG. 6.

At Step S710, the controller 15 determines whether the current location has reached the rear edge of the search range for the window height, as at Step S480. When the current location already reaches the rear edge of the search range for the current location, the controller 15 selects Yes at Step S710 and then proceeds to Step S780. When the current location does not yet reach the rear edge of the search range for the current location, the controller 15 selects No at Step S710 and then returns to Step S610. At Step S780, the controller 15 determines that the detection of a shadow is unsuccessful and then returns to the process in the flowchart of FIG. 6.

Conceivable cases where the controller 15 selects Yes at Step S680 include a case where the controller 15 mistakenly detects the thickness of a line printed on the junction 23 as a window height during the process in FIG. 6 and then mistakenly recognizes the height of a continuous blank present upstream of the detected line as a shadow height during the shadow detection process at Step S510 and some other subsequent steps. Another conceivable case is that, since an excessively large number of white pixels are arrayed, the controller 15 may select Yes multiple times at Step S680 and consequently may proceed to Step S780 via Step S710.

At Step S720, the controller 15 determines whether the flag is set to ON or OFF, as at Step S660. When the flag is set to ON, the controller 15 selects Yes and then proceeds to Step S730. When the flag is set to OFF, the controller 15 selects No and then proceeds to Step S750. At Step S730, the controller 15 sets the Y coordinate at the rear edge of the shadow to a value obtained by subtracting "1" from the Y coordinate at the current location ((Y coordinate at current location)−1) and then proceeds to Step S740. Since the block pixel is positioned at the current location at the time of Step S730, the controller 15 regards the white pixel positioned next to and on the negative side of this black pixel along the Y-axis as the rear edge of the shadow.

At Step S740, the controller 15 updates the window height by adding the value of the shadow height to the current value of the window height. In this case, the window height has been detected at the time of the completion of Step S490 in FIG. 6 and corresponds to the height of the area formed of the sequence of black pixels. The shadow height is detected by repeating Step S670 during the current ON period of the flag and corresponds to the height of the area formed of the sequence of white pixels. The controller 15 determines the window height by adding "1" (the number of black pixels at current location) to the total of the window height and the shadow height. Through the process to Step S740, the controller 15 has substantially completed the detection of the shadow height and, from then on, updates the window height containing the shadow height. At Step S740, the controller 15 sets the flag to OFF and then proceeds to Step S700.

At Step S750, the controller 15 increments the window height. More specifically, the controller 15 updates the window height by adding "1" (the number of pixels at current location) to the current value of the window height. After having completed the process at Step S750, the controller 15 proceeds to Step S700.

When the pixel at the current location is white and the flag is set to OFF at Step S660, the controller 15 selects No and then proceeds to Step S760. At Step S760, the controller 15 calculates the value obtained by subtracting "1" from the Y coordinate at the current location ((Y coordinate at current location)−1) and then sets the Y coordinate at the rear edge of the window to the calculated value, after which the controller 15 proceeds to Step S770. Since the pixel at the current location is white at the time of Step S760, the controller 15 regards the black pixel positioned next to and on the negative side of this white pixel along the Y-axis as the rear edge of the window. At Step S770, the controller 15 determines that the detection of the shadow is successful and then returns to the process in the flowchart of FIG. 6.

At Step S530 in FIG. 6, the process is branched into two steps; the controller 15 selects to which step it proceeds, depending on the result of the shadow detection process. More specifically, when the detection of the shadow is successful and the window height detected at the time of the completion of Step S520 falls within the range from the window height lower limit to the window height upper limit, the controller 15 selects Yes at Step S530 and then proceeds to Step S550. When the detection of the shadow is unsuccessful or when it is successful but the window height detected at the time of the completion of Step S520 falls outside the range from the window height lower limit to the window height upper limit, the controller 15 selects No at Step S530 and then proceeds to Step S540. Through the process in the flowchart of FIG. 6, the controller 15 can determine that detection of the window height is unsuccessful, except when Yes is selected at Step S510 or S530.

The process flow after Step S490 will be described with reference to FIGS. 7B and 8. The controller 15 regards the distance between the Y coordinates (y2) and (y4) as the window height at the time of Step S490. The controller 15 thus selects No at Step S510. At Step S610 in FIG. 8, the controller 15 acquires the white pixel at the current location, which is on the X-Y coordinates (x1, y4+1). After selecting Yes at Step S620, the controller 15 performs the processes at Steps S630 to S670 in this order. The controller 15 then repeats selecting No at Step S680, No at Step S710, Yes at Step S620, No at Step S630, and Yes at Step S660 multiple times in a cyclic manner. When the current location reaches the X-Y coordinates (x1, y5) at which a black pixel appears following the sequence of the white pixels forming the shadow 2, the controller 15 selects No at Step S620.

After selecting Yes at Step S720 and performing the processes at S730, S740, and S700 in this order, the controller 15 repeats No at Steps S710, S620, and S720 multiple times in a cyclic manner. When the current location moves over the X-Y coordinates (x1, y3) to the positive side along the Y-axis on which a white pixel appears following the sequence of black pixels, the controller 15 selects Yes at Step S620. The controller 15 then selects No at Step S660 and then performs the process at Step S760, thereby regarding the distance between the Y coordinates (y2) and (y3) as the window height. In the example of FIG. 7B, the window height corresponding to the distance between the Y coordinates (y2) and (y3) contains the shadow height of the shadow 2 corresponding to the distance between the Y coordinates (y4) and (y5).

In the above window height detection process, the controller 15 determines the total height of a first area in which a plurality of white pixels, or a plurality of pixels in the second colors, are sequentially arrayed in the transport direction D1 and a plurality of second areas which are arranged with the first area therebetween in the transport direction D1 and in each of which a plurality of black pixels, or a plurality of pixels in the first color, are sequentially arrayed. When this total length falls within the range from the window height lower limit to the window height upper limit, the controller 15 determines that the detection of the window height is successful. The shadow height detected as illustrated in FIG. 8 corresponds to the length, in the transport direction D1, of the first area in which the white pixels are arrayed. In this case, the areas between the Y coordinates (y2) to (y4) and between the Y coordinates (y5) to (y3) correspond to the second areas which are arranged with the shadow therebetween in the transport direction D1 and in each of which the black pixels are arrayed. In FIG. 7B, the distance between the Y coordinates (y2) to (y3) corresponds to the total height. Moreover, in the window height detection process, the controller 15 scans pixels arrayed on the X coordinate (x1), or on the reference detection location in the binary image data, thereby recognizing an area in which a plurality of pixels in the same color are sequentially arrayed, such as an area formed of a sequence of black pixels or a sequence of white pixels.

6. DETAILS OF WINDOW WIDTH DETECTION PROCESS

Figure 9:
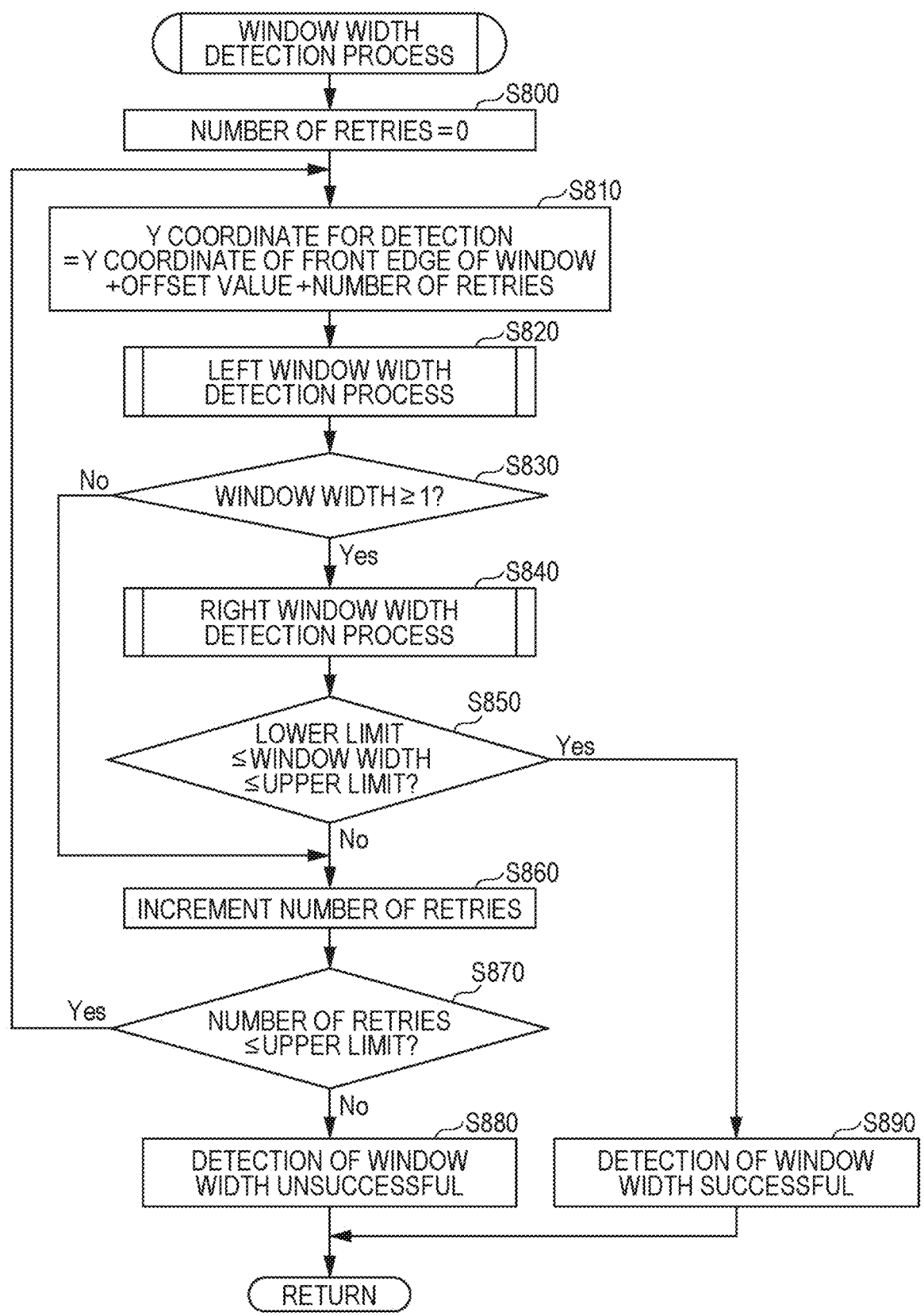
FIG. 9 is a flowchart of the window width detection process at Step S350 in FIG. 5.

FIG. 9 is a flowchart of the window width detection process at Step S350 in FIG. 5. The window width detection process is also referred to as the window width detection step. At Step S800, the controller 15 initializes the number of retries for detecting the window width to "0". At Step S810, the controller 15 sets the Y coordinate to be used to detect the window width. More specifically, the controller 15 sets this Y coordinate to the value obtained by totaling the Y coordinate at the front edge of the window, an offset value, and the number of retries. It should be noted that the Y coordinate at the front edge of the window has already been detected at Step S440 in the window height detection process. If the target window is the first window 24, the controller 15 employs the Y coordinate at the front edge of the first window 24.

The offset value corresponds to a predetermined distance to be reserved to detect the window width independently of an impact of white pixels forming a shadow. This offset value is preset based on the specifications regarding the window height and an expected shadow height. Using the offset value can detect a window height at a location that is a predetermined distance or more apart from the downstream edge of the total length when the detection of the window height is successful, namely, from the Y coordinate at the front edge of the window to the upstream side in the transport direction D1 in the binary image data. The number of retries for setting the Y coordinate may be the number of pixels related to the number of retries at that time. Obviously, the number of retries is "0" at Step S810 immediately after Step S800 has been completed.

The X coordinate at which the detection starts in the window width detection process is set to the reference detection location (x1), as in the window height detection process. In this embodiment, the width direction D2 is also referred to as the horizontal direction. Furthermore, a first side in the width direction D2 is referred to a left side, whereas a second side in the width direction D2 is referred to a right side. At Step S820, the controller 15 performs a left window width detection process, in which a sequence of pixels in the first color are detected from the reference detection location (x1) toward the left side, or the first side, in the width direction D2. It does not matter on which of the left window width detection process and a right window width detection process is to be performed first.

At Step S830, the process is branched into two steps; the controller 15 selects to which step it proceeds, depending on whether one or more window widths have been detected. The unit of the window width may also be the number of pixels. When detecting one or more window widths at Step S820, the controller 15 selects Yes at Step S830 and then proceeds to Step S840. When detecting no window widths at Step S820, the controller 15 selects No at Step S830 and then proceeds to Step S860.

At Step S840, the controller 15 performs the right window width detection process, in which a sequence of pixels in the first color is detected from the reference detection location (x1) toward the right side, or the second side, in the width direction D2. At Step S850, the controller 15 determines whether the window width that has been acquired at Steps S820 and S840 falls within the range from a predetermined window width lower limit to a predetermined window width upper limit. When the window width falls within the range from the window width lower limit to the window width upper limit, the controller 15 selects Yes and then proceeds to Step S890. When the window width falls outside the range from the window width lower limit to the window width upper limit, the controller 15 selects No at Step S850 and then proceeds to Step S860.

Both the window width upper limit and the window width lower limit are preset based on the specifications of the CS 20 regarding the window width so as to consider the allowable range for the window width, which can be used to determine whether a window width detected from the binary image data is a correct one. At Step S890, the controller 15 determines that the detection of the window width of the target window is successful and then return to the process in the flowchart of FIG. 5. The determination at Step S890 or Step S880 described later is directly reflected in that at Step S360 in FIG. 5.

At Step S860, the controller 15 increments the number of retries. More specifically, the controller 15 updates the number of retries by adding "1" to the current value of the number of retries. At Step S870, the controller 15 determines whether the number of retries updated is equal to or less than a predetermined upper limit, which has been preset. When the number of retries after the update is equal to or less than the upper limit, the controller 15 selects Yes at Step S870 and then returns to Step S810. When the number of retries updated is more than the upper limit, the controller 15 selects No at Step S870 and then returns to Step S880. At Step S880, the controller 15 determines that the detection of the window width of the target window is unsuccessful and then returns to the process in the flowchart of FIG. 5.

Figure 10:
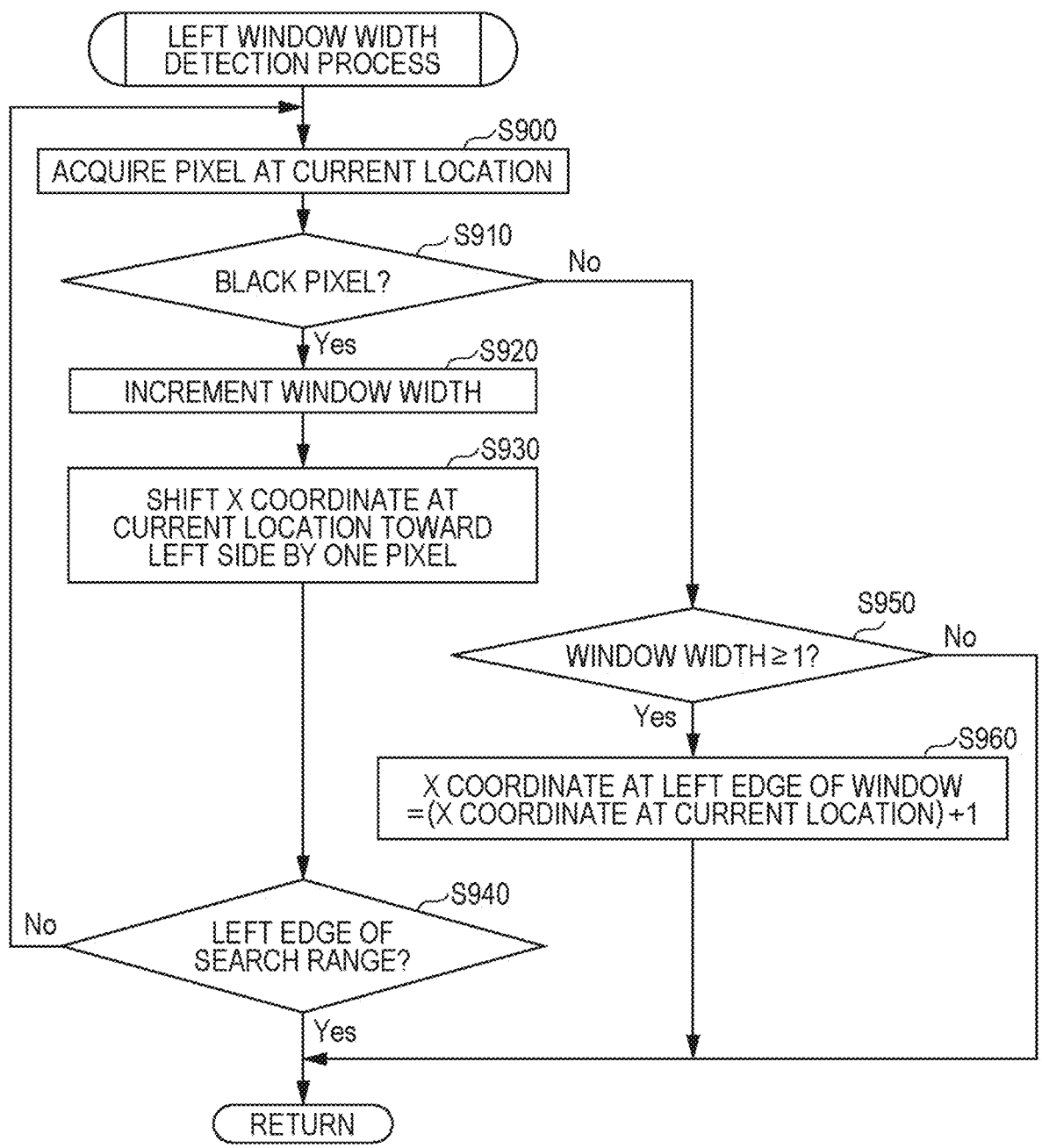
FIG. 10 is a flowchart of the left window width detection process at Step S820 in FIG. 9.

FIG. 10 is a flowchart of the left window width detection process at Step S820 in FIG. 9. At Step S900, the controller 15 acquires the pixel at the current location. At the first time when the process at Step S900 of Step S820 is performed, the controller 15 sets the X-Y coordinates at the current location to the X coordinate (x1) (reference detection location) and the Y coordinate that has been set at Step S810.

At Step S910, the process is branched into two steps; the controller 15 selects to which step it proceeds, depending on whether the pixel at the current location is black or white. When the pixel at the current location is black, the controller 15 selects Yes at Step S910 and then proceeds to Step S920. When the pixel at the current location is white, the controller 15 selects No at Step S910 and then proceeds to Step S950. At Step S920, the controller 15 increments the window width. In this case, since the initial value of the window width is "0" during the process in the flowchart of FIG. 10, the controller 15 updates the window width from "0" to "1" when the process at Step S920 is performed for the first time.

At Step S930, the controller 15 updates the current location by shifting the X coordinate at the current location toward the left side by one pixel. In this X-Y coordinate system, the positive side along the X axis is referred to as the right side, whereas the negative side along the X axis is referred to as the left side. At Step S940, the controller 15 determines whether the current location has reached the left edge of a search range for the window width. The search range for the window width refers to the distance in the width direction D2 which has been predefined based on the specifications of the CS 20 regarding the window width and is defined so to be long enough for the reader 13 to scan a target object to detect the window width of a window. The controller 15 may set the center of the search range for the window width at the reference detection location and may make determinations at Step S940 and at Step S1040 described later.

After the current location has reached the left edge of the search range for the window width, the controller 15 no longer continues to detect the window width because it is difficult to accurately detect the window width. The controller 15 accordingly selects Yes at Step S940 and then completes the process in the flowchart of FIG. 10, after which the controller 15 returns to the process in the flowchart of FIG. 9. When the current location has not yet reached the left edge of the search range for the window width, the controller 15 selects No at Step S940 and then returns to Step S900.

At Step S950, the controller 15 determines whether the window width is equal to or more than 1. When the window width is equal to or more than 1, the controller 15 selects Yes and then proceeds to Step S960. When the window width is equal to "0" at the time of Step S950, the controller 15 selects No at Step S950 and then completes the process in the flowchart of FIG. 10, after which the controller 15 returns to the process in the flowchart of FIG. 9.

At Step S960, the controller 15 sets the X coordinate at the left edge of the window to the X coordinate (X coordinate+1) obtained by adding 1 to the X coordinate at the current location. The controller 15 then completes the process in the flowchart of FIG. 10, after which the controller 15 returns to the process in the flowchart of FIG. 9. Since the white pixel is positioned at the current location at Step S960, the controller 15 determines that the pixel next to and on the right side of this white pixel is positioned on the coordinate of the left edge of the window. After having completed the left window width detection process through Step S960, the controller 15 determines that the window width is equal to or more than 1, namely, selects Yes at Step S830 in FIG. 9. After having completed the left window width detection process by selecting Yes at Step S940 or No at Step S950, the controller 15 selects No at Step S830.

Figure 11:
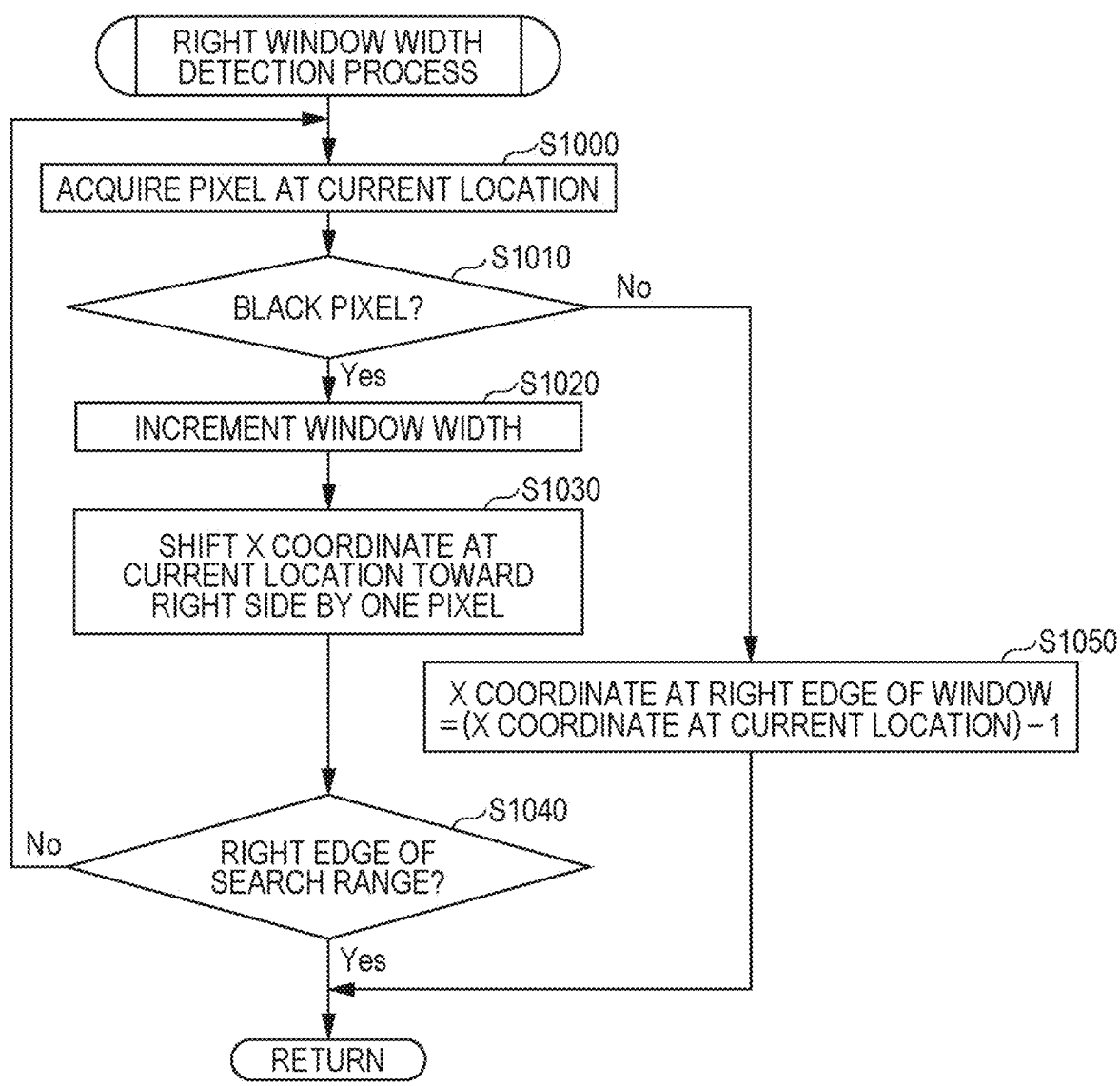
FIG. 11 is a flowchart of the right window width detection process at Step S840 in FIG. 9.

FIG. 11 is a flowchart of the right window width detection process at Step S840 in FIG. 9. At Step S1000, the controller 15 acquires the pixel at the current location. At the first time when the process at Step S1000 of Step S840 is performed, the controller 15 sets the X-Y coordinates at the current location to the X coordinate (x1+1), which is obtained by adding 1 to the X coordinate x1 (reference detection location) and the Y coordinate that has been set at Step S810. Since it has already been confirmed through the left window width detection process that the black pixel is positioned at the X coordinate (x1) (reference detection location) and the Y coordinate that has been set at Step S810, the controller 15 starts the right window width detection process from the pixel next to and on the right side of this black pixel.

At Step S1010, the process is branched into two steps; the controller 15 selects to which step it proceeds, depending on whether the pixel at the current location is black or white. When the pixel at the current location is black, the controller 15 selects Yes at Step S1010 and then proceeds to Step S1020. When the pixel at the current location is white, the controller 15 selects No at Step S1010 and then proceeds to Step S1050.

At Step S1020, the controller 15 increments the window width. In this case, since the controller 15 has already counted the window width at the same Y coordinate at Step S920 in the left window width detection process, the controller 15 takes over this window width for the incrementation at Step S1020 in the right window width detection process. The window width determined in this manner corresponds to the first color width, which is the length of the area in which a plurality of pixels in the first color are sequentially arrayed in the width direction D2. Moreover, the window width processed at Step S1020 corresponds to the total length of a third area in which a plurality of pixels in the first color are sequentially arrayed from the reference detection location toward the first side in the width direction D2 and a fourth area in which a plurality of pixels in the first color are sequentially arrayed from the reference detection location toward the second side in the width direction D2.

At Step S1030, the controller 15 updates the current location by shifting the X coordinate at the current location toward the right side by one pixel. At Step S1040, the controller 15 determines whether the current location has reached the right edge of the search range for the window width. After the current location has reached the right edge of the search range for the window width, the controller 15 no longer continues to detect the window width because it is difficult to accurately detect the window width. The controller 15 accordingly selects Yes at Step S1040 and then completes the process in the flowchart of FIG. 11, after which the controller 15 returns to the process in the flowchart of FIG. 9. When the current location has not yet reached the right edge of the search range for the window width, the controller 15 selects No at Step S1040 and then returns to Step S1000.

At Step S1050, the controller 15 sets the X coordinate at the right edge of the window to the X coordinate (X coordinate−1) obtained by subtracting "1" from the X coordinate at the current location. The controller 15 then completes the process in the flowchart of FIG. 11, after which the controller 15 returns to the process in the flowchart of FIG. 9. Since the white pixel is positioned at the current location at Step S1050, the controller 15 determines that the pixel next to and on the left side of this white pixel is positioned on the coordinate of the left edge of the window. After having completed the right window width detection process through Step S1050, the controller 15 determines whether the window width falls within the range from the window width lower limit to the window width upper limit, as at Step S850. After having completed the right window width detection process by selecting No at Step S1040 or No at Step S950, the controller 15 promptly selects No at Step S850.

Figure 12A:
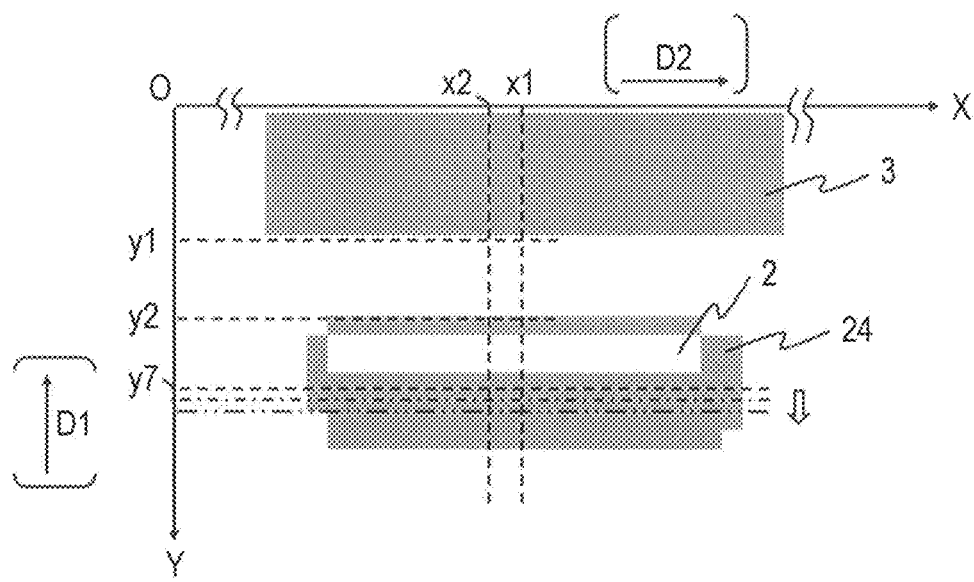
FIG. 12A illustrates still another example of the X-Y coordinate system in which a segment of the binary image data is expanded.

FIG. 12A illustrates an example of the X-Y coordinate system in which a segment of the binary image data is expanded. Since the binary image data illustrated in FIG. 12A is identical to that in FIG. 7B, the same description will be given again below. With reference to FIG. 12A, the process flow of the window width detection process will be described below. When the number of retries is "0", at Step S810, the controller 15 adds an offset value to the Y coordinate (y2) at the front edge of the window, thereby setting a Y coordinate for use in detecting the window width to a Y coordinate (y7). In this case, the offset value corresponds to the distance between the Y coordinates (y2) and (y7). After that, at Step S820 or S840, the controller 15 detects the window width by shifting the current location along the horizontal line at the Y coordinate (y7). Using the offset value as in the example of FIG. 12A is effective in suppressing the horizontal line at the Y coordinate (y7) from passing through the shadow 2.

When proceeding to Step S860 after the detection of the window width at the Y coordinate (y7), the controller 15 retries, or re-performs, the processes from Step S820 until the number of retries has reached the upper limit. In this case, the controller 15 shifts the Y coordinate to the positive side every time the number of retries increases. In FIG. 12A, single and double dotted lines are drawn on the positive side of the Y coordinate (y7). Along these lines, the current location will be horizontally shifted every time the retry is made.

Figure 12B:
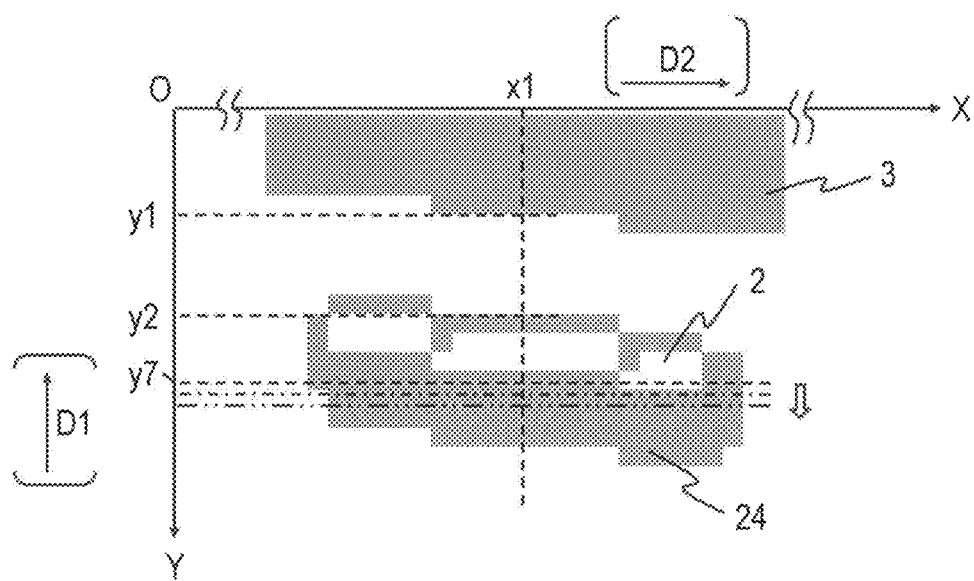
FIG. 12B illustrates yet another example of the X-Y coordinate system in which a segment of the binary image data is expanded.

FIG. 12B illustrates still another example of the X-Y coordinate system in which a segment of the binary image data is expanded. The example of FIG. 12B differs from that of FIG. 12A in that the result of reading the first window 24, for example, is angled with respect to both the X- and Y-axes. The reason for this is that the target object is transported by the transport section 12 while angled in the transport direction D1. With reference to FIG. 12B, the process flow of the window width detection process will be described below. When the number of retries is "0", at Step S810, the controller 15 sets the Y coordinate for use in detecting the window width to the Y coordinate (y7), as described in the example of FIG. 12A. In the example of FIG. 12B, however, the horizontal line at the Y coordinate (y7) partly passes through the shadow 2 inside the first window 24. Consequently, the result of detecting the window width at the Y coordinate (y7) at Step S820 or S840 may fail to satisfy the condition at Step S850, in which case the controller 15 selects No.

To avoid such disadvantages, as described above, the controller 15 resets the Y coordinate at Step S810 and then retries the processes from Step S820. In short, the controller 15 repeats, up to the maximum number of times, the process of detecting an area in the first color, the width of which falls within the range from the window width lower limit to the window width upper limit while shifting the current location in the binary image data in the transport direction D1. It is thereby possible to increase the possibility of accurately detecting the window width of a window, for example, even if the reading result is angled as in the example of FIG. 12B.

7. CONCLUSION

According to an embodiment of the present disclosure, an image reading apparatus 10 includes: a transport section 12 configured to transport a carrier sheet (CS) 20 in a predetermined transport direction D1, the CS 20 having a junction 23 at which peripheries of two sheets 21 and 22 are partly joined together, the sheets 21 and 22 having respective transparent areas between which an original sheet is to be interposed; a reader 13 configured to read a target object being transported by the transport section 12; and a controller 15 that acquires image data, the image data being generated as a result of reading the target object with the reader 13. The junction 23 has a window that transmits light. The controller 15 is configured to perform a window height detection process and a window width detection process, based on binary image data generated as a result of a binarization process. In the window height detection process, a window height that indicates a length of the window in the transport direction D1 is detected. In the window width detection process, a window width that indicates a length of the window in a width direction D2 is detected, the width direction D2 intersecting the transport direction D1. In the binarization process, a predetermined color generated as a result of reading the window is converted into a first color, and a color other than the predetermined color is converted into a second color. When a total height of a first area and a plurality of second areas falls within a range from a predetermined window height lower limit to a predetermined window height upper limit in the window height detection process, the controller 15 determines that detection of the window height is successful. In the first area, a plurality of pixels in the second color are sequentially arrayed in the transport direction D1; in the second areas, a plurality of pixels in the first color are sequentially arrayed in the transport direction D1; and the second areas are arranged with the first area therebetween in the transport direction. When a first color width falls within a range from a predetermined window width lower limit to a predetermined window width upper limit in the window width detection process, the controller 15 determines detection of the window width is successful, the first color width indicating a length of an area in which a plurality of pixels in the first color are sequentially arrayed in the width direction. When the detection of both the window height and the window width is successful, the controller 15 determines that the target object is the CS 20. When the detection of at least one of the window height and the window width is unsuccessful, the controller 15 determines that the target object is not the CS 20.

With the above configuration, if the binary image data contains a first area in which a plurality of pixels in the second color are sequentially arrayed in the transport direction D1, when a total length of the first area and a plurality of second areas in each of which a plurality of pixels in the first color are sequentially arrayed in the transport direction D1 and between which the first area is present in the transport direction D1 falls within the range from the window height lower limit to the window height upper limit, the controller 15 determines detection of the window height is successful. Consequently, it is possible to accurately detect the window height, thereby precisely determining and detecting that a target object is a CS even if an actual result of reading a window is formed of a plurality of areas separated from one another due to the impact of a shadow.

According to this embodiment, when a first color height that indicates a length of an area in which a plurality of pixels in the first color are sequentially arrayed in the transport direction D1 falls within the range from the window height lower limit to the window height upper limit in the window height detection process, the controller 15 may determine that the detection of the window height is successful.

With the above configuration, the controller 15 may be able to determine that the detection of the window height is successful, in accordance with a height of an area in the first color.

According to this embodiment, the controller 15 may determine a reference detection location in the binary image data in the width direction D2, based on location information that predefines a central location of the window in the width direction D2. Then, in the window height detection process, the controller 15 may recognize an area in which a plurality of pixels in the same color are sequentially arrayed by scanning, in the transport direction D1, pixels in the binary image data which are disposed at the reference detection location.

With the above configuration, even if the target object being transported is somewhat shifted or angled, when the target object is the CS 20, the controller 15 may be able to substantially reliably recognize an area in which a plurality of pixels in the first color or the second color are sequentially arrayed in the transport direction D1, at a location passing in the transport direction D1 through the range of the result of reading the window.

According to this embodiment, the controller 15 may regard, as the first color width, a total length of a third area and a fourth area in the width direction D2, in the window width detection process. In the third area, a plurality of pixels in the first color are sequentially arrayed from the reference detection location toward a first side in the width direction D2. In the fourth area, a plurality of pixels in the first color are sequentially arrayed from the reference detection location toward a second side in the width direction D2.

The above configuration may be able to reduce the risk of the controller 15 mistakenly detecting, as the window, an object other than a window and present adjacent to this window, as opposed to a configuration in which the window width is detected by scanning pixels from the first side to the second side in the width direction D2 or from the second side to the first side in the opposite direction. In this case, the object that is other than the window and present adjacent to the window may be a figure, a pattern, or letter printed on the junction 23.

According to this embodiment, after the detection of the window height is successful, the controller 15 may acquire the first color width at a location that is a predetermined distance apart, in an upstream direction, from a downstream edge of the total length in the transport direction D1 in the binary image data, in the window width detection process.

With the above configuration, the controller 15 may be able to avoid detecting the first color width at a location where pixels in the second color are closely disposed due to the impact of a shadow, by acquiring the first color width at a location shifted in the upstream direction from the front edge of the window. In this case, the lower edge of the total height in the transport direction D1 after the detection of the window height is successful may be replaced with the lower edge of the first color height in the transport direction D1 after the detection of the window height is successful.

According to this embodiment, in the window width detection process, the controller 15 may repeat, a predetermined maximum number of times or less, a process of detecting the first color width within the range from the window width lower limit to the window width upper limit while changing a location in the binary image data in the transport direction D1. When detecting the first color width within the range from the window width lower limit to the window width upper limit, the controller 15 may determine the detection of the window width is successful.

With the above configuration, the controller 15 may repeat detecting the first color width under the limitation of the maximum number of times while changing a location in the binary image data in the transport direction D1, thereby successfully accurately detecting the first color width as the window width with a high probability.

According to this embodiment, the junction 23 may have, as the window, a first window 24 and a second window 25 disposed at different locations. When the controller 15 successfully detects a window height and a window width of the first window 24 by performing the window height detection process and the window width detection process on the first window 24 and successfully detects a window height and a window width of the second window 25 by performing the window height detection process and the window width detection process on the second window 25, the controller 15 may determine that the target object is the CS 20.

With the above configuration, when successfully detecting the window heights and the window widths of two windows, the controller 15 may determine that the target object is the CS 20. Consequently, it may be possible to determine that the target object is the CS 20 with a further high probability. In this case, the junction 23 may be three or more windows as long as the controller 15 can recognize in advance the number of windows and the positional relationship thereof. In addition, the positional relationship of the windows does not necessarily have to conform to the aspect of FIG. 2.

In addition to the apparatus, this embodiment discloses a method to be performed by the apparatus. More specifically, the embodiment discloses a method of detecting a CS 20 which is performed by an image reading apparatus 10. The image reading apparatus 10 includes: a transport section 12 configured to transport a carrier sheet (CS) 20 in a predetermined transport direction D1, the CS 20 having a junction 23 at which peripheries of two sheets 21 and 22 are partly joined together, the sheets 21 and 22 having respective transparent areas between which an original sheet is to be interposed; and a reader 13 configured to read a target object being transported by the transport section 12. In the method of detecting a CS 20, the junction 23 has a window that transmits light. This method includes: a binarization step of converting a predetermined color in image data into a first color and converting a color other than the predetermined color in the image data into a second color to generate binary image data, the predetermined color being generated as a result of reading the window, the image data indicating a result of reading a target object with the reader 13; a window height detection step of detecting a window height, based on the binary image data, the window height indicating a length of the window in the transport direction D1; and a window width detection step of detecting a window width, based on the binary image data, the window width indicating a length of the window in a width direction D2, the width direction D2 intersecting the transport direction D1. When a total height of a first area and a plurality of second areas falls within a range from a predetermined window height lower limit to a predetermined window height upper limit in the window height detection step, it is determined that detection of the window height is successful. In the first area, a plurality of pixels in the second color are sequentially arrayed in the transport direction D1; in each of the second areas, a sequence of pixels in the first color is arrayed in the transport direction D1; and the second area is arranged with the first area therebetween in the transport direction. When a first color width falls within a range from a predetermined window width lower limit to a predetermined window width upper limit in the window width detection step, it is determined that detection of the window width is successful, the first color width indicating a length of an area in which a plurality of pixels in the first color are sequentially arrayed in the width direction D2. When the detection of both the window height and the window width is successful, it is determined that the target object is the CS 20. When the detection of at least one of the window height and the window width is unsuccessful, it is determined that the target object is not the CS 20.

This embodiment further provides the following features. As described above, the image reading apparatus 10 may further include a multi-feeding detector 14 that detects multi-feeding of original sheets. Further, after determining that target objects are CSs 20, the controller 15 may stop the multi-feeding detector 14 from detecting the multi-feeding of the CSs 20. After determining that target objects are not CSs 20, the controller 15 may cause the multi-feeding detector 14 to continue to detect the multi-feeding of the CSs 20. In other words, when terminating the process in the flowchart of FIG. 4 at Step S190, the controller 15 may make the function of the multi-feeding detector 14 disabled. When terminating the process in the flowchart of FIG. 4 at Step S200, the controller 15 may keep the function of the multi-feeding detector 14 enabled. This configuration may be able to suppress the multi-feeding detector 14 from mistakenly detecting multi-feeding of CSs 20 during the transport of the CSs 20.

After determining that a target object is the CS 20, the controller 15 may delete an area in the image data which corresponds to a result of reading the junction 23 and then may output the image data remaining after deletion. In other words, after completing the process in the flowchart of FIG. 4 at Step S190, the controller 15 may delete an area corresponding to the result of reading the junction 23 from the image data acquired from the reader 13 as a result of reading the target object. This deleting is easy to perform because the size and location of the junction 23 can be acquired in advance by controller 15. This configuration may be able to delete an unnecessary result of reading the junction 23 and output image data substantially regarding the result of reading an original sheet alone.

The "output" described herein refers to, for example, storing of data in a memory or a storage device inside or outside the image reading apparatus 10 or data transfer from the image reading apparatus 10 to an external computer in a wired or wireless manner. Although not illustrated in FIG. 1, the image reading apparatus 10 may be a copy machine or may be configured to print the image data after the above deletion on a paper sheet and output it. Obviously, the controller 15 may output the image data after the deletion to a display screen.

The controller 15 may perform, based on the binary image data, a vertical line determination process in which the controller 15 determines whether a vertical line along which a plurality of pixels in the second color are sequentially arrayed in the transport direction D1 is present. The controller 15 then may perform the window height detection process at locations in the width direction D2 other than locations at which the vertical line is determined to be present. For example, this vertical line is generated due to the impact of foreign matter adhering to an image sensor and is formed of white pixels in the binary image data to which the binarization process has been subjected. If such a vertical line appears across the window, the controller 15 may fail to accurately detect the window.

The above vertical line determination process may be any method of determining the presence/absence of a vertical line. For example, consider the case where, in the window height detection process of FIG. 6, the controller 15 determines that the pixel at the current location is not black at Step S420, then selects No at Step S460, No at Step S480, and No at Step S420 multiple times in a cyclic manner, and selects Yes at Step S480. In this case, the controller 15 may determine that a vertical line is present at the X coordinate (x1) at which a current window height is to be detected. The controller 15 then may newly set the initial point to another X coordinate, such as the X coordinate (x2) in FIG. 12A, and may start the window height detection process at this location. In short, if a vertical line is present at an X coordinate at which the window height detection process will start, the controller 15 may set the initial point again. With this configuration, the controller 15 may be able to suppress an occurrence of a disadvantage in which the impact of a vertical line hinders an accurate detection of the window height.

If a vertical line is present, this vertical line splits the sequence of black pixels in the width direction D2 which constitutes the window width. In this case, the controller 15 may regard the pixel at the X coordinate on the vertical line as being back, regardless of whether it is white or black and may detect the window width during the window width detection process. With this configuration, the controller 15 may be able to suppress an occurrence of a disadvantage in which the impact of a vertical line hinders an accurate detection of the window width.

Instead of using a single device, the image reading apparatus 10 may be implemented using a system that includes a plurality of devices interconnected so as to be able to communicate with one another. More specifically, the image reading apparatus 10 may be implemented using a system that includes: a scanner that transports a target object with the transport section 12 and reads it with the reader 13; and a control device, such as a computer, that acquires image data from the scanner as the read result, analyzes the image data, and performs a method of detecting a CS 20.

What is claimed is:

1. An image reading apparatus comprising:
   a transport section configured to transport a carrier sheet in a predetermined transport direction, the carrier sheet having a junction at which peripheries of two sheets are partly joined together, the sheets having respective transparent areas between which an original sheet is to be interposed;
   a reader configured to read a target object being transported by the transport section; and
   a controller that acquires image data, the image data being generated as a result of reading the target object with the reader,
   the junction having a window that transmits light,
   the controller being configured to perform a window height detection process and a window width detection process, based on binary image data generated as a result of a binarization process, in the window height detection process a window height indicating a length of the window in the transport direction being detected, in the window width detection process a window width indicating a length of the window in a width direction being detected, the width direction intersecting the transport direction, in the binarization process a predetermined color generated as a result of reading the window being converted into a first color, and a color other than the predetermined color being converted into a second color,
   wherein when a total height of a first area and a plurality of second areas falls within a range from a predetermined window height lower limit to a predetermined window height upper limit in the window height detection process, the controller determines that detection of the window height is successful, in the first area a plurality of pixels in the second color being sequentially arrayed in the transport direction, in the second areas a plurality of pixels in the first color being sequentially arrayed in the transport direction, the second areas being arranged with the first area therebetween in the transport direction,
   when a first color width falls within a range from a predetermined window width lower limit to a predetermined window width upper limit in the window width detection process, the controller determines detection of the window width is successful, the first color width indicating a length of an area in which a plurality of pixels in the first color are sequentially arrayed in the width direction,
   when the detection of both the window height and the window width is successful, the controller determines that the target object is the carrier sheet, and
   when the detection of at least one of the window height and the window width is unsuccessful, the controller determines that the target object is not the carrier sheet.

2. The image reading apparatus according to claim 1, wherein
   when a first color height that indicates a length of an area in which a plurality of pixels in the first color are sequentially arrayed in the transport direction falls within the range from the window height lower limit to the window height upper limit in the window height detection process, the controller also determines that the detection of the window height is successful.

3. The image reading apparatus according to claim 1, wherein
   the controller determines a reference detection location in the binary image data in the width direction, based on location information that predefines a central location of the window in the width direction, and
   in the window height detection process, the controller recognizes an area in which a plurality of pixels in the same color are sequentially arrayed by scanning, in the transport direction, pixels in the binary image data which are disposed at the reference detection location.

4. The image reading apparatus according to claim 3, wherein
   the controller regards, as the first color width, a total length of a third area and a fourth area in the width direction in the window width detection process, in the third area a plurality of pixels in the first color being sequentially arrayed from the reference detection location toward a first side in the width direction, in the fourth area a plurality of pixels in the first color being sequentially arrayed from the reference detection location toward a second side in the width direction.

5. The image reading apparatus according to claim 1, wherein
   after the detection of the window height is successful, the controller acquires the first color width at a location that is a predetermined distance apart, in an upstream direction, from a downstream edge of the total length in the transport direction in the binary image data, in the window width detection process.

6. The image reading apparatus according to claim 1, wherein
   in the window width detection process, the controller repeats, a predetermined maximum number of times or less, a process of detecting the first color width within the range from the window width lower limit to the window width upper limit while changing a location in the binary image data in the transport direction, and
   when detecting the first color width within the range from the window width lower limit to the window width upper limit, the controller determines the detection of the window width is successful.

7. The image reading apparatus according to claim 1, wherein the junction has, as the window, a first window and a second window disposed at different locations, and when the controller successfully detects a window height and a window width of the first window by performing the window height detection process and the window width detection process on the first window and successfully detects a window height and a window width of the second window by performing the window height detection process and the window width detection process on the second window, the controller determines that the target object is the carrier sheet.

8. The image reading apparatus according to claim 1, further comprising a multi-feeding detector that detects multi-feeding of a plurality of original sheets, wherein after determining that target objects are carrier sheets, the controller stops the multi-feeding detector from detecting the multi-feeding of the carrier sheets, and after determining that target objects are not carrier sheets, the controller causes the multi-feeding detector to detect the multi-feeding of the carrier sheets.

9. The image reading apparatus according to claim 1, wherein after determining that a target object is the carrier sheet, the controller deletes an area in the image data which corresponds to a result of reading the junction and then outputs the image data remaining after deletion.

10. The image reading apparatus according to claim 1, wherein the controller performs, based on the binary image data, a vertical line determination process in which the controller determines whether a vertical line along which a plurality of pixels in the second color are sequentially arrayed in the transport direction is present and then performs the window height detection process at a location in the width direction other than a location at which the vertical line is determined to be present.

11. A method of controlling an image reading apparatus, the image reading apparatus including a transport section configured to transport a carrier sheet in a predetermined transport direction, the carrier sheet having a junction at which peripheries of two sheets are partly joined together, the sheets having respective transparent areas between which an original sheet is to be interposed and a reader configured to read a target object being transported by the transport section, the junction having a window that transmits light, the method comprising:

a binarization step of converting a predetermined color in image data into a first color and converting a color other than the predetermined color in the image data into a second color to generate binary image data, the predetermined color being generated as a result of reading the window, the image data indicating a result of reading a target object with the reader;

a window height detection step of detecting a window height, based on the binary image data, the window height indicating a length of the window in the transport direction; and a window width detection step of detecting a window width, based on the binary image data, the window width indicating a length of the window in a width direction, the width direction intersecting the transport direction, wherein when a total height of a first area and a plurality of second areas falls within a range from a predetermined window height lower limit to a predetermined window height upper limit in the window height detection step, it is determined that detection of the window height is successful, in the first area a plurality of pixels in the second color being sequentially arrayed in the transport direction, in the second areas a plurality of pixels in the first color being sequentially arrayed in the transport direction, the second area being arranged with the first area therebetween in the transport direction, when a first color width falls within a range from a predetermined window width lower limit to a predetermined window width upper limit in the window width detection step, it is determined that detection of the window width is successful, the first color width indicating a length of an area in which a plurality of pixels in the first color are sequentially arrayed in the width direction, when the detection of both the window height and the window width is successful, it is determined that the target object is the carrier sheet, and when the detection of at least one of the window height and the window width is unsuccessful, it is determined that the target object is not the carrier sheet.

* * * * *